INVENTORS
Wallace E. Brainard
Hans J. Baechle
BY William C. Gleaney Jr.
Attorney

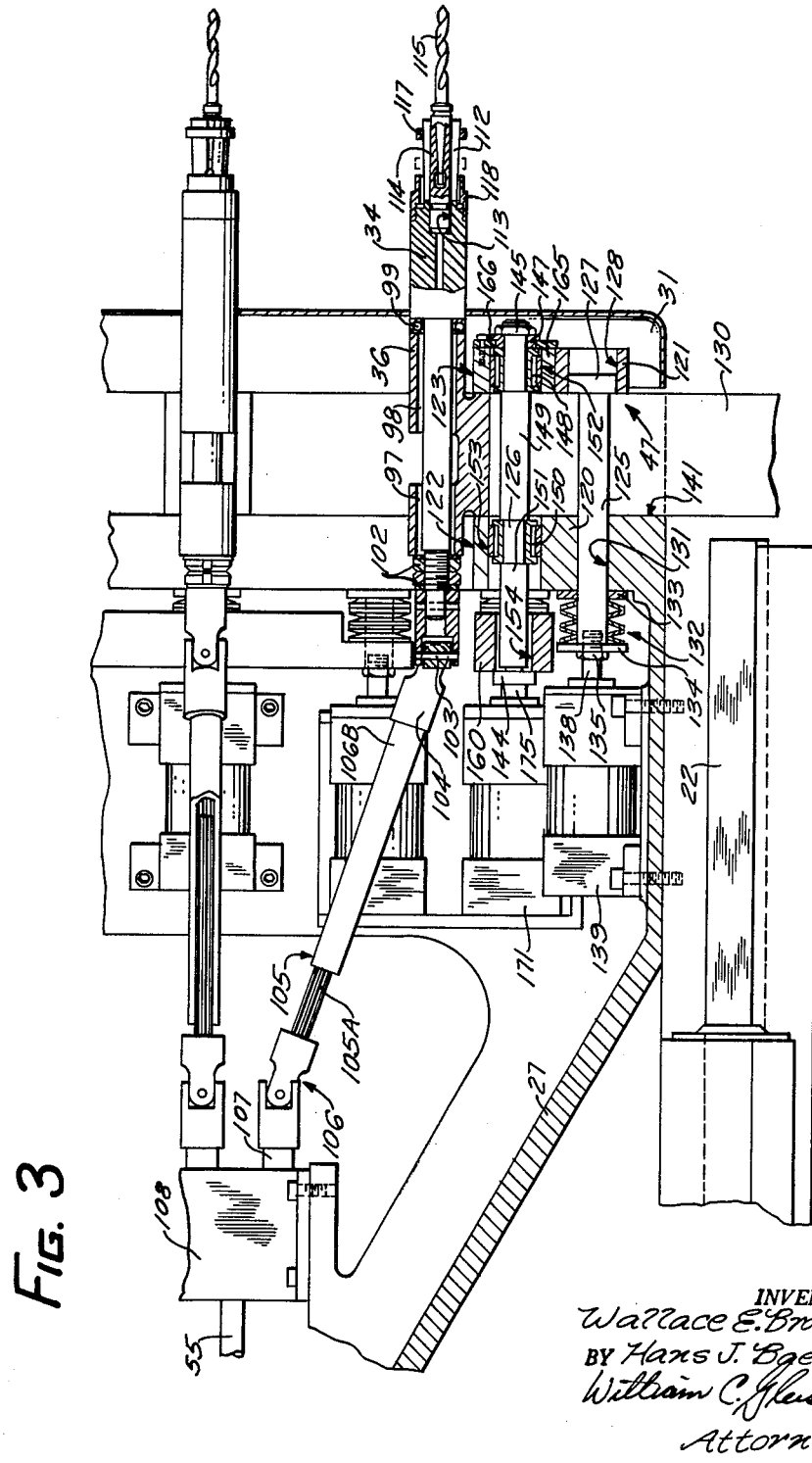

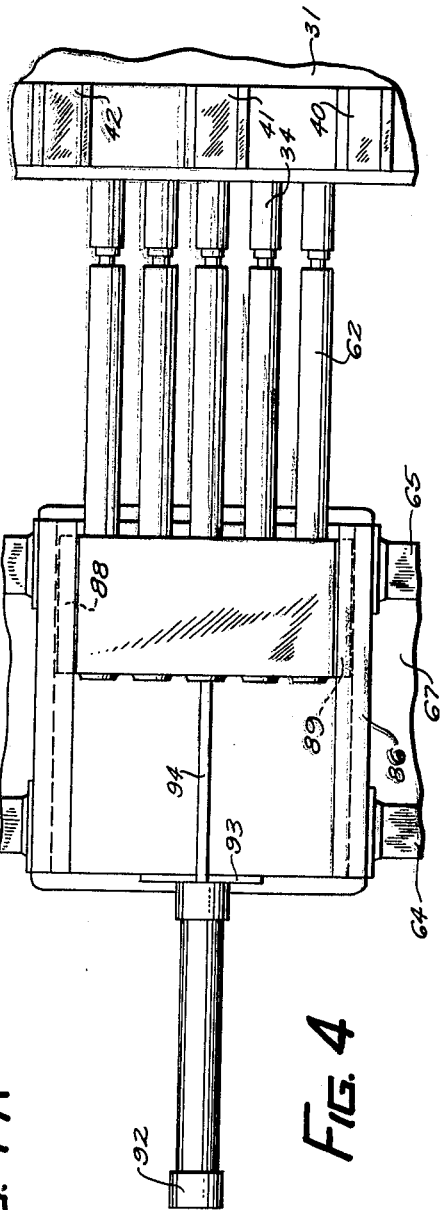

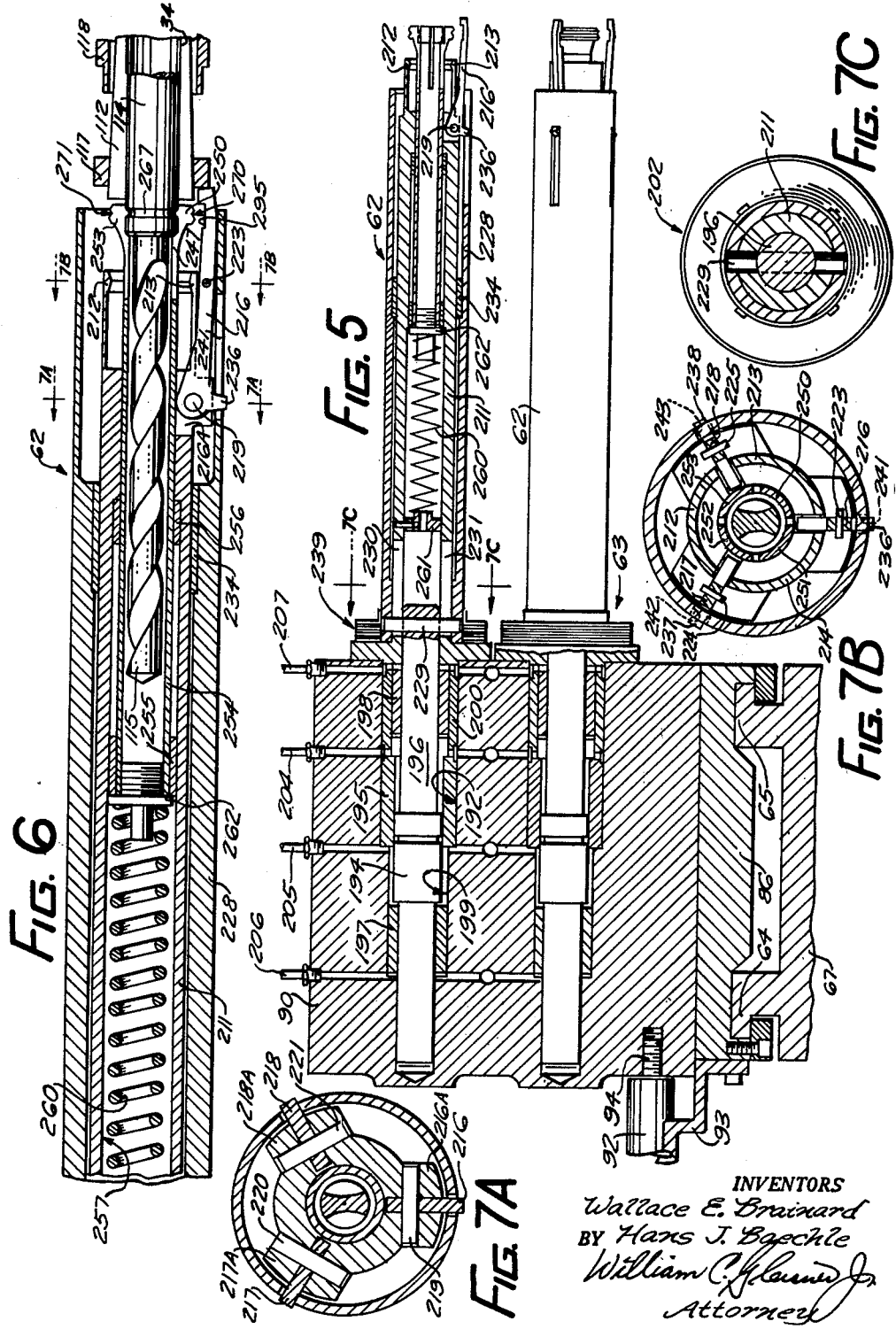

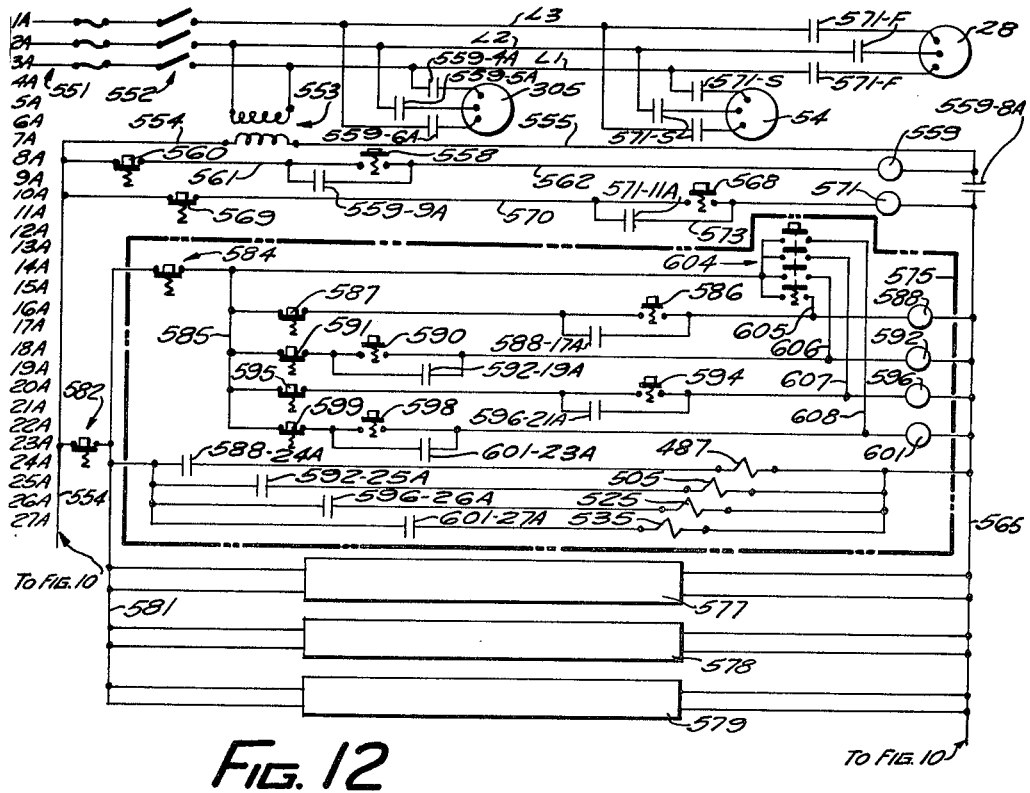

United States Patent Office 3,188,736
Patented June 15, 1965

3,188,736
MULTIPLE SPINDLE TOOL CHANGER
Wallace E. Brainard, Milwaukee, and Hans J. Baechle, West Allis, Wis., assignors to Kearney & Trecker Corporation, West Allis, Wis., a corporation of Wisconsin
Filed Mar. 14, 1961, Ser. No. 95,642
15 Claims. (Cl. 29—568)

This invention relates generally to multiple spindle machine tools, and more particularly to a multiple spindle machine tool incorporating an automatic tool changer operable to change a complete set of cutting tools.

A general object of this invention is to provide a greatly improved machine tool having multiple spindles particularly adapted for automatic tool changing.

Another object of the invention is to provide a multiple spindle machine tool having spindles equipped with automatically releasable tool securing means.

Another object of the invention is to provide an automatic tool change mechanism that is operative to interchange complete sets of tools between the spindles of a multiple spindle machine tool and a storage magazine.

Another object of the invention is to provide a tool changer for simultaneously interchanging a complete set of tools carried by the spindles of a multiple spindle machine tool with a preselected set of a plurality of sets of cutting tools carried by a storage magazine.

A further object of the invention is to provide a multiple spindle tool changer incorporating means for selectively activating tool securing means respectively associated with the rotatable tool spindles of a multiple spindle machine tool.

A still further object of the invention is to provide a multiple spindle tool changer particularly adapted to be used in combination with a multiple spindle machine tool incorporating automatic spindle setting means and automatically releasable clamping means operable to fixedly retain the multiple spindles in selectively preset positions.

A still further object of the invention is to provide a multiple spindle tool changer particularly adapted to facilitate the initial setup of a multiple spindle machine tool for a next selected machining operation.

A still further object of the invention is to greatly increase the actual machining utilization and efficiency of a multiple spindle machine tool.

According to this invention, a multiple spindle machine tool is provided with a supporting frame having on its upper surface spaced apart, horizontally disposed ways adapted to slidably support a multiple spindle head for operating movement in a horizontal plane. Toward one end, the spindle head is provided with an enlarged opening within which are fixedly supported a plurality of horizontal rotatable tool carrying spindles that are carried for bodily movement with the spindle head in performing a multiple machining operation. Each of the multiple spindles is respectively journalled toward one end of separate, bodily movable support arms that are releasably clamped to the spindle head. For retaining the tool spindles in pre-selected positions in accordance with the requirements of a particular pattern of machining operations, selectively releasable power actuated clamps are respectively connected to fixedly clamp each of the spindle support arms to the head structure. According to the principles of this invention, the tool spindles are initially secured in a symmetrical pattern corresponding to the spacing of tool receiving openings formed in a spaced apart tool storage magazine. The magazine is provided with one set of empty tool receiving, storage sockets adapted to receive a complete set of tools carried by the tool spindles. Likewise, the tool storage magazine is provided with a plurality of sets of cutting tools which may be selectively interchanged with a set of tools carried by the tool spindles. To accomplish interchange of sets of cutting tools, there is provided a bodily movable tool change mechanism provided with a plurality of spaced apart tool receiving grips which are spaced apart in accordance with the spacing of the tool receiving sockets in the storage magazine. The tool change mechanism is selectively movable to a position for releasing the set of tools carried by the spindles, bodily moving these tools into alignment with the empty storage sockets, and depositing the set of tools in the empty storage sockets. Next, the tool change mechanism is actuated to simultaneously grip the next selected set of tools carried by the storage magazine, and effect bodily movement of those tools from stored position into the respective tool spindles. As an incident to inserting the selected set of tools into the empty tool spindles, the tool change mechanism is operative to actuate tool securing means respectively associated with the tool spindles, after which the tool change mechanism is returned to parked position.

The foregoing and other objects of the invention which will become more fully apparent from the following description of the improved multiple spindle tool changer may be achieved by the embodying mechanisms described herein in connection with the accompanying drawings, in which, FIGURE 1 is a view in perspective of a multiple spindle drilling machine including an indexable tool storage magazine and multiple tool change mechanism embodying the present invention;

FIG. 3 is a view in vertical section through a portion of the multiple tool spindle head, taken generally along the lines 3—3 in FIG. 2, and showing the operative interconnection of the spindle holder clamps;

FIG. 4 is a plan view of the multiple tool change mechanism, with the individual tool grips extended toward the multiple spindle head;

FIG. 4A is a code chart indicating the sequence of steps during a multiple tool interchange;

FIG. 5 is an enlarged fragmentary view, partly in side elevation, and partly in vertical section through the multiple tool change mechanism;

FIG. 6 is an enlarged fragmentary view in vertical section through a single tool grip or tool changer comprising one of a plurality of like tool grips carried by the tool change mechanism, in cooperatively disposed relationship with a drilling tool carried by one of the tool spindles;

FIGS. 7A, 7B and 7C are enlarged detailed views in vertical section, respectively taken along the corresponding lines in FIGS. 5 and 6;

Figure 9:
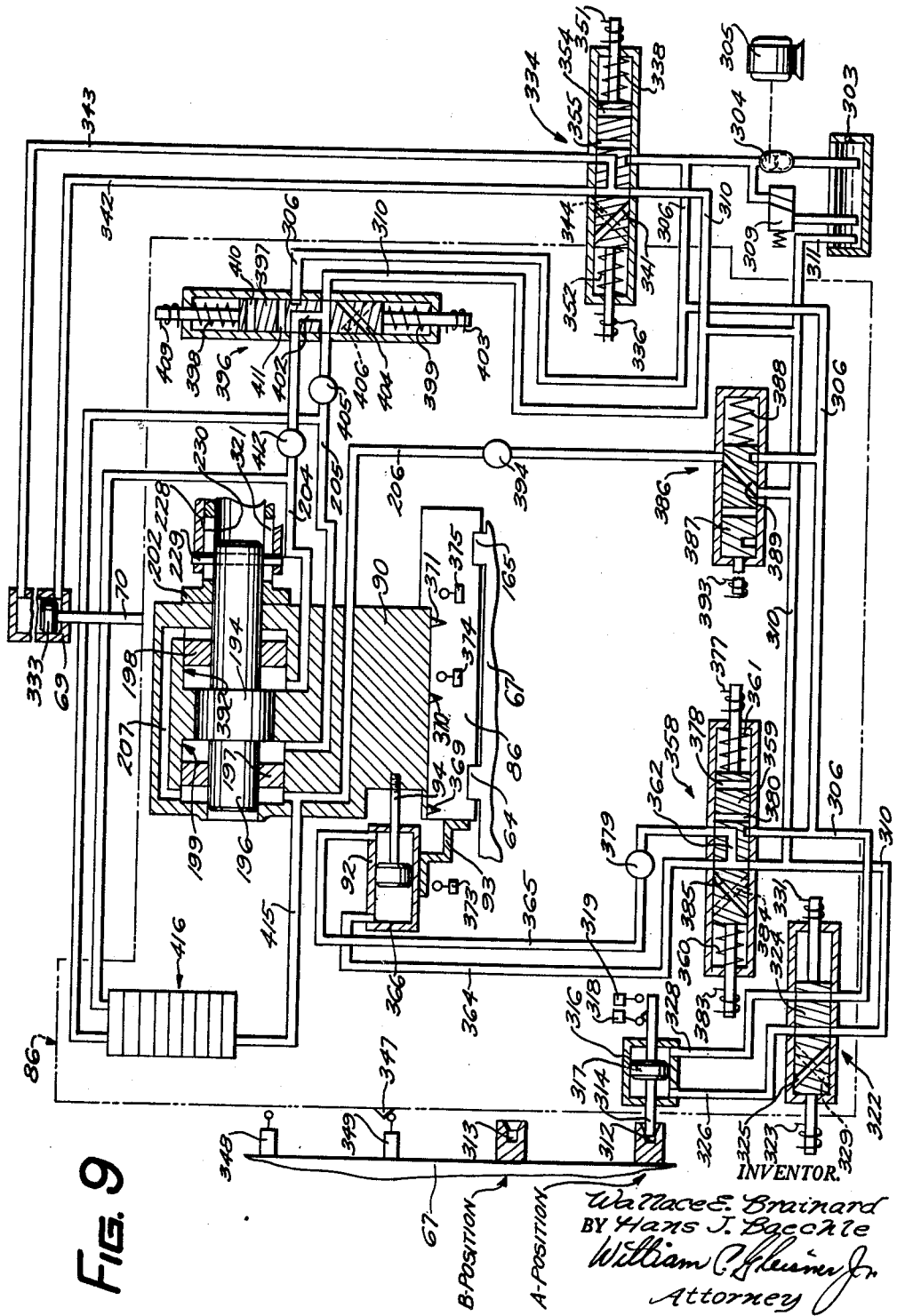
Figure 10:
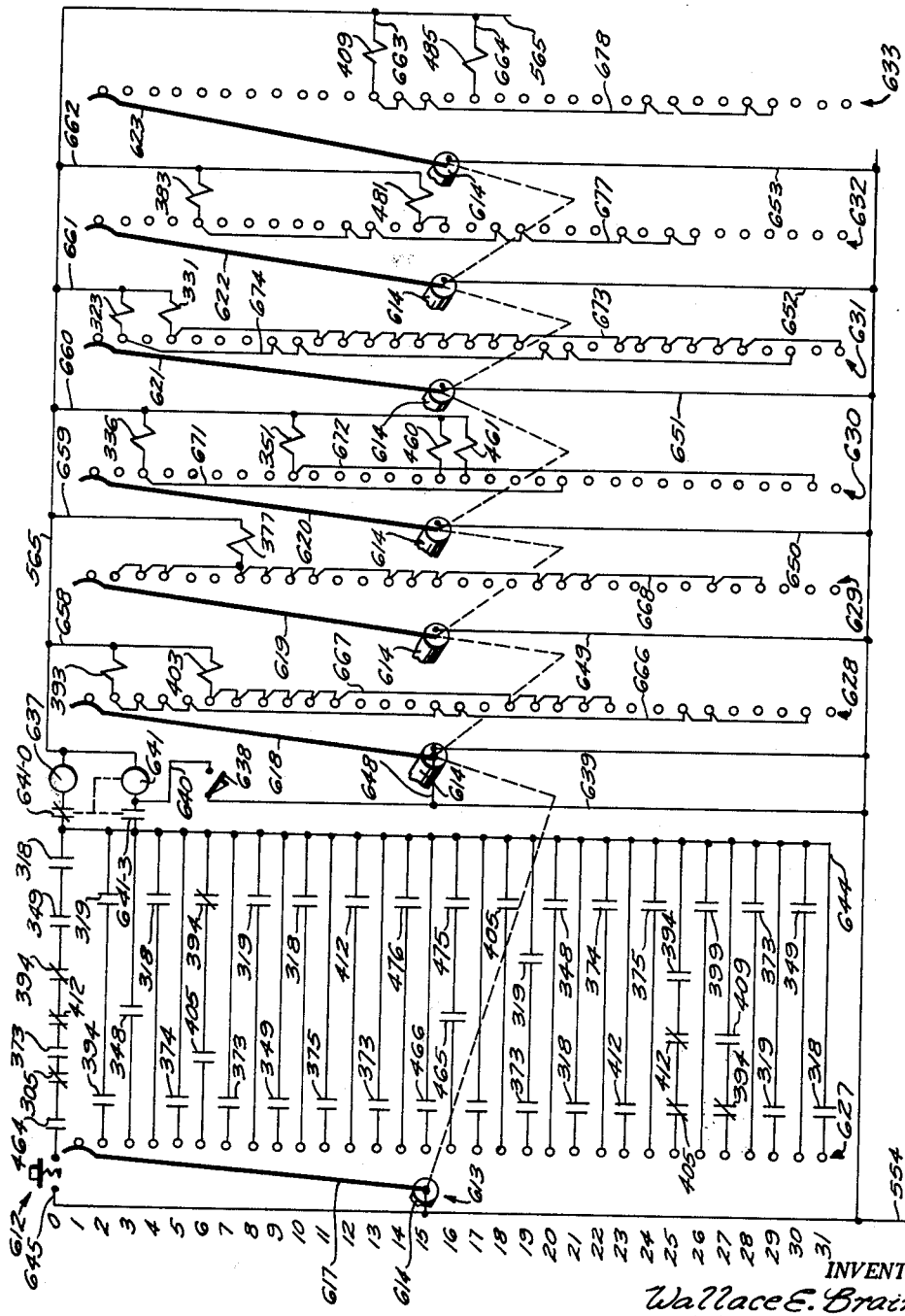
Figure 11:
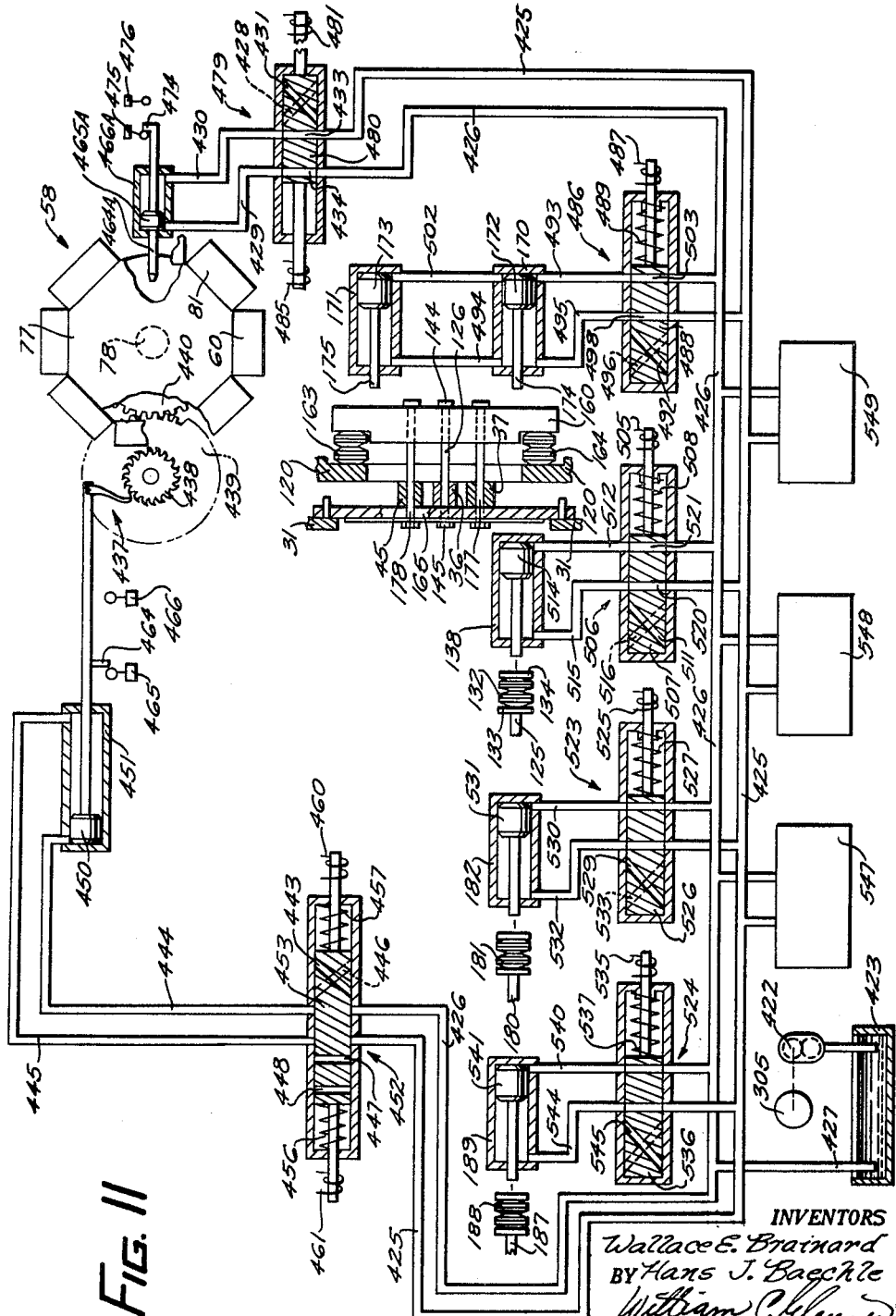

FIGS. 8A to 8H, inclusive, are enlarged fragmentary views in vertical section respectively showing certain dynamic operating steps during a tool change cycle;

FIG. 9 is a schematic diagram of a hydraulic control circuit for operating the tool change mechanism and individual tool change grips;

FIG. 10 is a schematic diagram of an electrical control circuit for actuating the hydraulic tool change actuating circuit represented in FIG. 9;

FIG. 11 is a schematic diagram of a hydraulic circuit for selectively actuating the spindle holder clamps;

FIG. 12 is a schematic diagram of an electrical control circuit energizing the entire machine and for actuating the hydraulic circuit represented in FIG. 11; and, FIG. 12A is an enlarged fragmentary view in vertical section through the forward end of a single tool grip and a single storage socket of one of the storage magazine sections.

Figure 1:
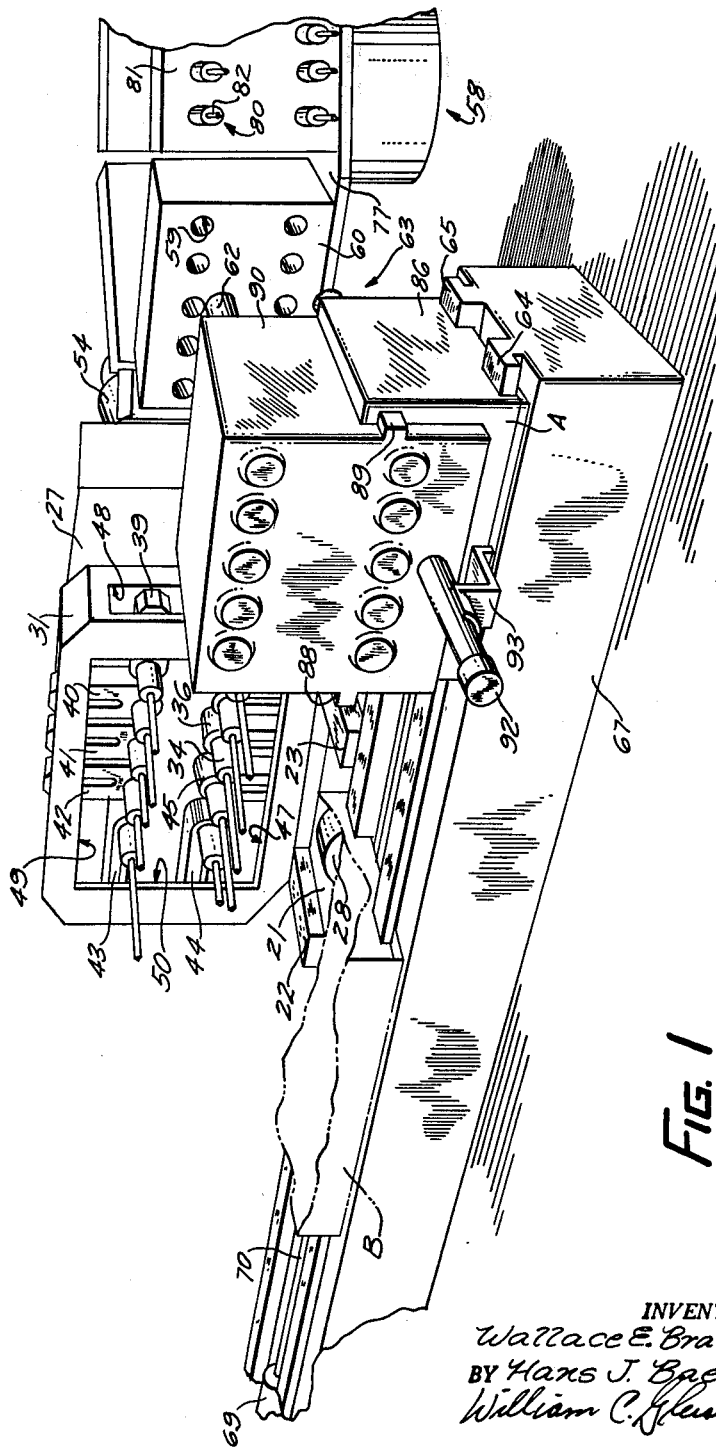
Figure 2:
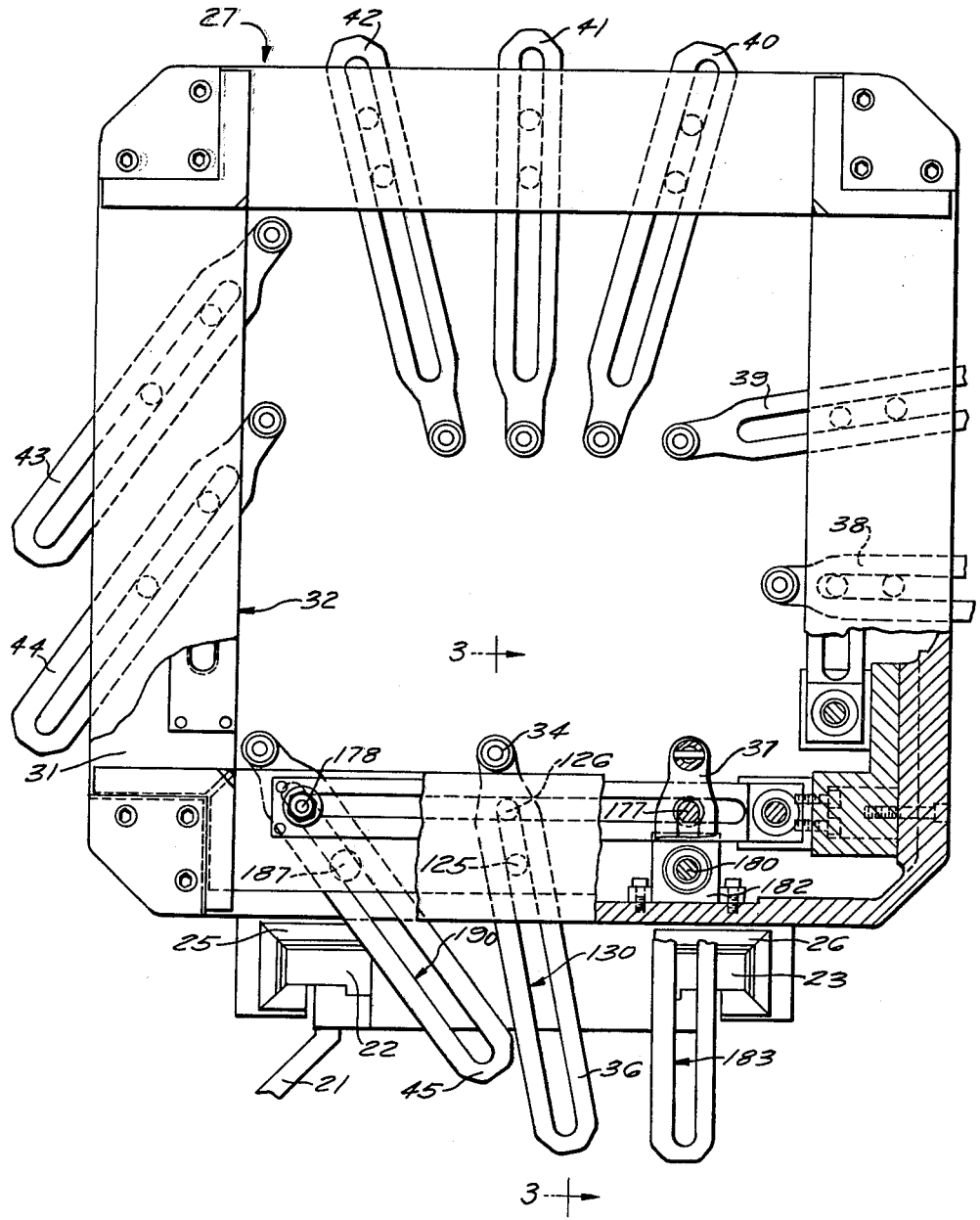
FIG. 2 is an enlarged detailed view, partly in front elevation and partly in vertical section, taken through the forward spindle supporting portion of the multiple spindle head structure.

Referring to the drawings and particularly to FIG. 1 thereof, the multiple spindle machine tool embodying the principles of this invention comprises a transversely extending base 21 provided on its upper surface with horizontally disposed way surfaces 22 and 23. The way surfaces 22, 23 are slidably engaged by complementary ways 25, 26 integrally formed with the underside of a bodily movable spindle head 27, as shown in FIGS. 1 and 2. A motor 28 carried within an opening between the ways 22 and 23 toward the forward portion of the base 21 is operatively connected in well-known manner to drive a variable feed transmission and screw and nut translating mechanism (not shown) for effecting the required bodily horizontal movement of the spindle carrying head 27 along the ways 22, 23 presented by the base 21.

At its forward enlarged end, the spindle 27 is provided with a rectangular structure 31 defining a generally rectangular central opening 32 that limits the lateral range of adjustment of presettable tool spindles adjustably carried by the head structure 31. As shown in FIGS. 1 and 2, a plurality of tool spindles, such as the spindle 34, are respectively journalled at the inner ends of laterally extending spindle holders or support arms 36 to 45, inclusive. The three spindle holders 45, 36 and 37 extend laterally inward through a clamping mechanism generally defined by a slot 47 formed toward the lower portion of the rectangular supporting structure 31. In a similar manner, the spindle holders 38, 39 extend laterally through an expansible clamping slot 48; spindle holders 40, 41 and 42 extend laterally upward through a clamping slot 49; and, spindle holders 43 and 44 extend laterally through a clamping slot 50. In all cases, the slots 48, 49 and 50 indicate generally the location of expansible clamping mechanisms operative to securely clamp the spindle support arms respectively extending therethrough.

As will hereinafter be more fully explained, there are provided power operable means for selectively, and simultaneously, releasing the supporting head structure 31 from clamped engagement with the spindle supporting holders 36 to 45 respectively. After the spindle holders have been unclamped, the tool spindles carried thereby may be repositioned within the rectangular opening 32 for drilling a different, predetermined pattern of holes. As soon as the spindles, such as the spindle 34, have been repositioned laterally with respect to the opening 32, the automatic clamping means are reactuated to positively clamp the spindle holders 36 to 45, inclusive, into fixed, laterally immovable position within the head structure 31.

Inasmuch as each of the tool spindles 34 is rotatable about an axis parallel to the axis of movement of the head 27 along the ways 22 and 23, it will be readily apparent that actuation of the feed driving motor 28 is operative to effect corresponding bodily movement of the tool spindles for effecting a multiple machining operation. During a machining operation, as shown in FIGS. 1 and 3, a spindle drive motor 54 is operatively connected to drive a variable speed transmission mechanism (not shown), the latter in turn being connected to drive a common output shaft 55. The common drive shaft 55 in turn is connected to effect simultaneous rotatable movement of all of the tool spindles, irrespective of their laterally adjusted position within the rectangular supporting frame 31. The variable speed transmission may be of any well-known type, and, as is well known in the art, is normally adjusted to provide an output speed appropriate for the largest diameter cutter carried by one or another of the tool spindles.

As illustrated in FIG. 1, the tool spindles have all been laterally moved to their respective "home" positions and the respective spindle holders 36 to 45, inclusive, urged into clamping engagement with the spindle head structure 31 to facilitate an interchange of tools with an indexable tool storage magazine 58 carried in spaced apart relationship to the spindle head 27. With the spindles positioned as represented in FIG. 1, the head 27 may be moved horizontally to drill a symmetrical pattern of holes as determined by the laterally adjusted position of the spindle holders. The selected "home" positions of the spindle represented in FIG. 1 corresponds to the spacing of tool storage sockets 59 formed in an empty tool storage magazine section 60.

Each of the storage sockets 59 in the storage magazine section 60 comprises a horizontally bored opening disposed in axial parallelism with a corresponding one of the tool spindles, whenever the spindles are clamped in "home" position within the spindle head structure 31. Each of the storage sockets is provided with a resilient detent mechanism adapted to resiliently engage a tool deposited therein.

As shown in FIG. 1, the tool storage sockets 59 presented by the empty magazine section 60 are horizontally aligned with corresponding, separate tool grips or tool changers 62 carried in horizontally spaced relationship by a multiple tool changing mechanism 63. Both the storage sockets 59 as well as the tool change grips 62 are arranged in two (2) tiers or rows, with five of them in each row. The multiple tool change mechanism 63 is slidably supported for longitudinal movement by horizontally disposed way surfaces 64 and 65 formed on the upper face of a longitudinally extending base or frame 67. Thus, the tool change mechanism 63 is longitudinally movable along the way 64, 65 from the position in alignment with the empty storage section 60 into a position in correspondingly spaced aligned relationship to the head structure 31, with the spindles clamped in "home" positions.

To accomplish this, a hydraulic piston 69 carried by the base 67 is provided with a reciprocable piston rod 70 secured at its opposite end to the base of the tool change mechanism 63. Selective operation of the piston 69 effects movement of the tool change mechanism 63 from its solid line position indicated at "A" in FIG. 1 to a tool change position indicated by the phantom lines at "B." Whenever the spindle head is operated to effect a multiple machining operation, the tool change mechanism 63 is retained in the A position in a manner that a workpiece (not shown) may be moved into the B position for a required multiple machining operation. Thus, the tool change mechanism 63 is moved to the A position out of the working area directly in front of the tool spindle head 27 during machining operations.

In some instances it may be advantageous to advance workpieces successively along the ways 64 and 65 into the operating station directly in front of the spindle head 27. In such cases, it will be apparent that the tool change mechanism 63 may be moved to a different parked position (not shown) to facilitate the successive movement of workpieces along the ways.

The empty tool storage section 60 is fixedly secured to an octagonal plate 77 journalled at its central portion to rotate about a vertically disposed hub 78, as shown in FIGS. 1 and 11. In addition to the empty tool storage section 60, seven other tool storage sections are secured in identical spaced apart relationship to the upper face of the octagonal plate 77. Each of these storage sections is provided with separate sets of ten tool storage sockets, such as the socket 80 in storage section 81. As will hereinafter be more fully explained, power operable means are connected to effect selective indexable advancement of the support plate 77 for positioning a selected one of the storage sections in a position for effecting a tool interchange. A latch mechanism is provided to retain the selected storage magazine section in proper alignment with the tool change mechanism 63.

As shown in FIGS. 1, 4 and 5, the tool change mechanism 63 comprises essentially a supporting base 86 that is slidably carried by the ways 64 and 65 for selective longitudinal movement. The base 86, in turn, is provided with spaced apart upwardly extending sides presenting ways that slidably engage laterally extending, complementary ways 88 and 89 integrally formed with a transversely movable tool change support 90. A hydraulic cylinder 92 secured to the tool change support base 86 by means of a bracket 93 is provided with a reciprocable piston rod 94 threadedly engaging the transversely movable tool change support 90. Selective actuation of the cylinder 92 operates to advance the tool change support 90 from its retracted position, shown in FIGS. 1 and 5, either to a forward position relative to one of the storage magazine sections, or the tool spindles carried by the spindle head 27. In FIG. 4, the movable tool change support 90 is represented as being moved forwardly relative to its base 86 in a manner that the individual tool change grip 62 are in encompassing relationship to the tools respectively carried by the tool spindles.

To effect an interchange of complete sets of tools between the tool spindles carried by the head 27 and the storage magazine 58, the tool spindles are initially moved from their previously preset positions to the "home" position illustrated in FIG. 1. At this moment, an empty storage section, such as 60, carried by the magazine 58 is in front of the tool change mechanism 63. Likewise, at this moment, rotational movement of the spindles is stopped and the tool change support 90 is in retracted position relative to the movable tool change support base 86 which is retained in parked position as indicated at "A." With these conditions existing, the hydraulic cylinder 69 is actuated to effect bodily longitudinal movement of the tool change mechanism 63 along the ways 64 and 65 into a position in which the tool grips 62 are aligned with corresponding ones of the tool spindles. Next, the cylinder 92 is actuated to advance the movable support 90 relative to the base 86 in a manner that the individual tool grips 62 encompass the tools carried by the corresponding spindles.

As shown in FIG. 4, the movable tool change support 90 is represented as being advanced to a position in which the upper tier of five individual tool change grips 62 encompass the corresponding tools carried by the upper tier of tool spindles. It will be apparent that the lower tier of five individual tool grips likewise are positioned to encompass the tools carried by the lower tier of tool spindles. As will hereinafter be more fully explained, the individual tool grips are then actuated to release corresponding tools from the tool spindles and securely clamp the individual tools during the simultaneous tool interchange. After this, the cylinder 92 is again actuated to retract the movable support 90 and individual tool grpis 62 for withdrawing the tools from the spindles. As soon as the movable support 90 is fully retracted, the cylinder 69, FIG. 1, is again actuated to effect bodily movement of the tool change mechanism 63 to the "A" position.

Next, cylinder 92 is actuated to urge the support 90 outwardly for effecting simultaneous insertion of the tools now carried by the grip 62 into the sockets 59 presented by the empty magazine section 60. With the original set of tools now deposited in the storage section 60, the movable support 90 is again retracted, and the support plate 77 indexed to position the next selected set of tools in front of the retracted tool grips. As soon as this occurs, the support 90 is advanced to secure the selected set of tools, after which it is again retracted to withdraw the tools from the storage section, and the entire tool change mechanism 63 moved longitudinally to the "B" position. Cylinder 92 is again actuated to effect movement of the tool change support 90 in a manner that the selected set of tools are inserted and secured in the now empty tool spindles. After this, the support 90 is again retracted, and the entire tool change mechanism 63 returned to the parked position "A," with the individual tool grips aligned with the empty storage sockets of the empty storage section.

As will hereinafter be more fully explained, a control circuit is operatively connected to effect the proper sequential operation of the tool change mechanism 63 in coordinated relationship with the individual tool grips 62, and the tool storage magazine 58. A principal advantage of this invention is the fact that once the tool spindles have been moved to "home" position, complete sets of tools can be interchanged automatically in preparation for the next multiple machining operation.

During a multiple machining operation, each of the ten tool spindles is rotatably driven by the spindle drive motor 54, as shown in FIGS. 1 and 3, irrespective of the laterally adjusted position of each spindle relative to the rectangular head structure 31. Inasmuch as the drive to all of the tool spindles is identical, only the driving connection to the spindle 34 will be described in detail. As shown in FIG. 3, the spindle 34 is rotatably journalled in sleeve bearings 97 and 98 respectively carried within concentrically disposed bored openings formed toward the inner end of the spindle support arm 36. A flanged shoulder formed toward the tool carrying end of the spindle 34 is seated against an antifriction thrust bearing 99. At its opposite end, a pair of lock nuts 102 engage a threaded portion of the spindle 34 to retain it in its rotatable operating position relative to the support arm 36. The extreme inner end of the spindle 34 is of reduced diameter and is pinned to a connector 103 connected by means of a universal joint to one end 104 of a telescoping power transmitting shaft 105. On the opposite end of the telescoping shaft 105 is connected by means of a universal joint 106 to a stub shaft 107 journalled in a power distributor 108. The power distributor 108 is provided with gearing (not shown) connected to be driven by the input drive shaft 55 and operable in well known manner to transmit driving power to a plurality of stub shafts, such as the rotatable stub shaft 107, respectively connected to drive all of the tool spindles. The telescoping shaft 105 comprises a splined shaft 105A having slidable meshing engagement with an internally splined tubular sleeve 105B. Thus, irrespective of the laterally adjusted position of the spindle support arm 36 relative to the supporting frame 31, the telescoping shaft 105 is operatively connected to transmit driving power to the tool spindle 34.

At its forward end, the tool spindle 34 is provided with an expansible tool receiving collet 112 having axial slots (not shown) to provide resilient jaws, and a circular socket 113 adapted to receive the circular shank of a toolholder 114. The toolholder 114 may be of any well-known type. As represented in FIG. 3, the toolholder 114 is provided with a tapered bored opening adapted to receive the complementary tapered shank of a metal cutting tool 115. Prior to insertion in either the sockets presented by the tool storage magazine 58, FIG. 1, or one or another of the tool spindles, a tool is mounted for subsequent use in a toolholder, such as the toolholder 114 in FIG. 3. Thus, during a tool change, both the toolholder 114 and tool carried thereby are interchanged between the storage magazine and a tool spindle. It is understood, however, that this invention is not limited to interchanging toolholders. It is merely necessary that a tool to be interchanged be provided with a shank adapted to be removably inserted into the circular socket 113 presented by the spring collet 112.

To retain a tool in the spindle 34, there is provided an axially slidable clamp ring 117, FIG. 3. Movement of the clamp ring 117 axially along the tapered shank of the collet to its outermost position, as shown in FIG. 3, effects inward movement of the resiliently expansible collet jaws into tight gripping engagement with the periphery of the toolholder 114. Prior to removal of a tool and its associated toolholder, the friction ring 117 is moved axially inward into abutting engagement with an adjusting collar 118 threaded on the outer end of the tool spindle 34. Movement of the clamp ring into abutting engagement with the adjusting collar 118 permits resilient expansion of the jaws of the slotted collet for releasing the tools.

The expansible clamping and guide slot 47 for the spindle support arm 36 is formed by way surfaces presented by a transverse web 120 integrally formed with the spindle head 27 and a spaced apart transverse web 121 disposed in parallelism therewith. The inner edges 122 and 123 of the transverse head webs 120 and 121 respectively define one side of the rectangular opening presented by the rectangular spindle supporting structure 31. Likewise, the spaced apart webs 120 and 121 are arranged to carry axially movable spindle support clamps 125 and 126 respectively. The clamp 125 constitutes a stationary or pivot clamp, and the clamp 126 constitutes a laterally movable clamp. The axially movable clamp elements 125 and 126 operate both to clamp the spindle support arm 36 in selective laterally adjusted position, and when released, to engage the slot 130 for guiding the support arm 36 for subsequent repositioning of the tool spindle 34. To accomplish this, the pivot clamp element 125 is carried for only axial movement and the movable clamp 126 is carried for both axial movement and bodily lateral movement.

The pivot clamp 125 is provided at one end with a flanged head 127 carried for axial movement within a complementary recess 128 formed in the outer transverse web 121. As shown in FIGS. 2 and 3, the circular shank of the pivot clamp 125 extends through a longitudinally extending slot 130 formed in the spindle support arm 36. The pivot clamp 125 extends through a circular bored opening 131 formed in the transverse web 120 in concentric relationship to the recess 128 formed in the web 121. Concentric disks comprising a Belleville spring 132 encircle the leftward end of the pivot clamp 125 between a thrust washer 133 and a thrust washer 134 secured to the leftward end of the pivot clamp 125 by means of a cap screw 135. The pivot clamp cap screw 135 is axially aligned with a clamp release piston rod 138 carried by a cylinder 139, the latter being secured to an inner side wall of the spindle head 27.

Whenever the support arm 36 is fixedly clamped to the spindle head, the cylinder 139 is deactuated and the pivot clamp 125 urged leftwardly by means of the force exerted by the Belleville spring 132. As this occurs, the flanged end 127 of the pivot clamp 125 is urged inwardly into clamping engagement with the outer faces of the slotted support arm 36, the inner faces of which are then urged into abutting clamping engagement with the way surface 141 presented by the transverse web 120. The pivot clamp 125 is released by activating the hydraulic cylinder 139, thereby effecting outward movement of the piston rod 138 to compress the Belleville springs 132 between the thrust washers 133 and 134. Thereupon, the flanged head 127 of the pivot clamp 125 is moved slightly in an axial direction to permit lateral movement of the spindle support arm 36, providing clamp 126 is also released.

At one end, the movable clamp element 126 is provided with a flanged head 144, and at its opposite end with threads adapted to receive a lock nut 145. The lock nut 145 urges a flanged spacing sleeve 147 into abutting engagement with the inner race of a bearing 148, the latter in turn being maintained in abutting engagement with one end of a circular spacer sleeve 149. The opposite end of the spacer sleeve 149 abuts the inner race of a bearing 150, which is retained in engagement with one end of a tubular spacer sleeve 151. By means of this arrangement, the outer races of the antifriction bearings 148 and 150 are retained in guiding engagement with transverse slots 152 and 153 respectively formed in a floating clamp 165 and the transverse web 120. The outer periphery of the spacer sleeve 149 is identical in diameter to the circular clamp element 125 in a manner to engage the slot 130 formed in the support arm 36.

In a similar manner, the outer periphery of the spacer sleeve 151 engages a slot 154 formed in a bodily movable bridge clamp 160.

As schematically shown in FIG. 9, the bridge clamp 160 is provided with flanged ends respectively engaged by Belleville springs 163 and 164. The Belleville springs are seated at their opposite ends against the side face of the transverse web 120 integrally formed with the rectangular spindle head supporting structure 31. The movable clamp 126 for the central spindle support arm 36, extends through both the slot 154 formed in the bridge clamp 160 and the slot 153 formed in the transverse column web 120, as well as the slot 152 presented by the floating clamp 165. Likewise, the spacer sleeve 149 carried by the central portion of the movable clamp element 126 engages the slot 130 formed in the movable spindle support arm 36.

As shown in FIG. 3, the flanged shoulder of the spacer sleeve 147 directly engages a slot presented by a slotted way strip 166 secured directly to a side face of the floating clamp 165. As shown in FIG. 3, the slot presented by way strip 166 is slightly narrower in width than the slot 152 presented by the floating clamp 165 in a manner that the flanged shoulders of the spacer sleeve 147 directly engage the surface of the slotted clamp way strip 166. Whenever the spindle support arm 36 is retained in clamping engagement with the spindle head structure 31, the springs 163 and 164, FIG. 9, urge the bridge clamp 160 in a direction to effect corresponding axial movement of the movable clamp element 126 bringing the flanged shoulders of the spacer sleeve 147 into clamping engagement with the slotted way strip 166. As this occurs, the entire floating clamp 165 is moved in a direction to force the support arm 36 into tight clamping engagement with the way surface 141 presented by the transverse web 120.

To release the clamp element 126 for permitting lateral adjustment of the spindle support arm 36, there are provided a pair of spaced apart clamp release cylinders 170 and 171, shown in FIG. 9. Selective actuation of the cylinders 170 and 171 effects movement of pistons 172 and 173 which operate to urge piston rods 174 and 175 in a direction to compress Belleville springs 164 and 163. Thereupon, the bridge clamp 160 is bodily moved a distance sufficient to release the clamping pressure exerted against the flanged head 144 of clamp element 126. Normally, the clamping pressure is released sufficiently to permit selective lateral adjustment of the associated spindle support arm 36, while retaining sufficient frictional clamping pressure to preclude accidental displacement of the support arm.

Movement of the bridge clamp 160 to release the clamping pressure exerted by the movable clamp element 126 simultaneously operates to release the clamping pressure exerted by movable clamp elements 177 and 178 respectively associated with spindle support arms 37 and 45, as shown in FIGS. 2 and 9. The function and mode of operation of movable clamp elements 177 and 178 to guide the associated spindle support arms during lateral positioning, and clamp them to the spindle support 31 in selected positions is identical to the operation of movable clamp element 126. In a similar manner, the spindle support arm 37 is provided with a stationary pivot clamp 180 that is normally retained in clamped position by means of a Belleville spring 181 and is actuatable to released position by an associated hydraulic cylinder 182. Both the stationary pivot clamp 181 and movable pivot clamp 177 are disposed to engage a guide slot 183 formed in the spindle support arm 37.

The spindle support arm 45 is clamped to the supporting head 31 at a second spaced position along its length by means of a stationary pivot clamp 187 responsive to a Belleville spring 188. For compressing the Belleville spring 188 to release the stationary pivot clamp 187, there is provided an associated hydraulic cylinder 189. Both the stationary pivot clamp 187 and the movable pivot clamp 178 are disposed to engage a guide slot 190 formed in the movable support arm 45, as shown in FIG. 2.

As shown in FIG. 2 and schematically represented in FIG. 9, each of the spindle support arms 45, 36 and 37 are provided with a stationary pivot clamp and a laterally movable pivot clamp. In order to effect selective lateral adjustment of one or another of these spindle support arms, it is necessary to simultaneously release both the stationary pivot clamp and the associated laterally movable pivot clamp. As this is done, it will be apparent that one or another of the spindles may be moved laterally with respect to the rectangular opening 32 represented by the supporting structure 31. The distance of lateral spindle movement is determined by the length of the guiding slot in the arm and the spaced apart stationary and movable pivot clamps. For example, in the event both clamps 125, 126, FIG. 2, are released, the spindle 34 may be moved radially inward until the stationary pivot clamp 125 engages the outer end of the associated guiding slot 130. As this is done, the spindle 34 may be moved in an arcuate path with the stationary pivot clamp 125 constituting the pivot axis, irrespective of the position of the pivot clamp 125 along the guiding slot 130. During arcuate movement of the spindle 34 about a pivot axis determined by the stationary pivot clamp 125, it will be readily apparent that the movable guide clamp 126 is moved laterally with respect to the guide slots 153, 152 formed in the transverse web 120 and the floating clamp 165. After the spindle 34 has been laterally repositioned within the rectangular opening 32, both the stationary pivot clamp 125 and movable guide clamp 126 are re-engaged to fixedly clamp the tool spindle 34 in its next selected position.

As shown in FIG. 2, the spindle support arms 38 to 44, inclusive, are respectively provided with guide slots each of which is engaged by a stationary pivot clamp and a laterally movable pivot clamp. Separate bridge clamps (not shown) are respectively provided to actuate the movable clamps associated with spindle support arms 38 and 39; for spindle support arms 40, 41 and 42; and, for spindle support arms 43 and 44. The arrangement for clamping and releasing the spindle support arms 38 to 44, inclusive, is identical to the clamping and clamp actuating structure fully described with respect to the spindle support arms 45, 36 and 37.

As shown in FIG. 2, the spindle support arms 36 to 45 inclusive are laterally adjusted and clamped to position the associated tool spindles as may be required for a particular multiple machining operation. Prior to initiating a multiple tool change, it is necessary that the support arms 36 to 45 inclusive be repositioned in a manner that the tool spindles are returned to their home positions as shown in FIG. 1. As hereinbefore explained, the tool spindles in "home" position correspond to the spacing of the empty tool storage sockets 59 and the tool storage section 60 as well as the bodily retracted tool grips, such as 62 carried by the multiple tool change mechanism 63. To return the spindle support arms from the position shown in FIG. 2 to the "home" positions indicated in FIG. 1, the stationary pivot clamps and movable pivot clamps respectively associated therewith are released. After this, the spindles are bodily moved in a lateral direction to "home" position and the pivot clamps are reengaged to retain the tool spindles in that position for a subsequent tool changing operation. Positioning of the tool spindles in "home" position may be accomplished by means of a template (not shown). Likewise, a return movement of the tool spindles to "home" position may be effected by operation of a spindle positioning mechanism such as that disclosed in copending patent application Serial No. 66,067 entitled "Automatic Multiple Spindle Machine Tool," filed October 31, 1960, by Wallace E. Brainard. In either case, the multiple tool spindles are fixedly clamped to the spindle supporting structure 31, and the spindle head 27 is retracted in response to motor 28 to establish the conditions necessary for subsequent tool interchange.

During a tool interchange, as hereinbefore explained with reference to FIGS. 1 and 5, the hydraulic cylinder 69 is operative to effect bodily movement of the entire tool change mechanism 63 along the ways 64 and 65. Thus, the cylinder 69 is operative to position the tool change mechanism either in the "A" position in front of one or another of the tool storage magazine sections, or in the "B" position directly in front of the spindle head 27. The smaller cylinder 92 operates to effect transverse movement of the movable multiple tool change support 90. During transverse movement of the support 90, the cylinder 92 is likewise operative to position the ten individual tool changers or grips, such as the tool changer 62, into proper position for clamping or releasing a tool carried thereby. Inasmuch as the ten individual tool change grips function in an identical manner, it is deemed necessary to describe the operation of only one of them in detail. As shown in FIG. 5, the tool change grip 62 is actuated by a hydraulic piston 194 slidably carried within a sleeve cylinder 195 secured within an enlarged bored opening 192 in the movable tool change support 90. The piston 194 is integrally formed toward the central portion of an actuating piston rod 196 supported for selective axial movement within spaced apart, tubular centering sleves 197 and 198. The centering sleeve 197 is carried for a limited axial movement within a bored opening 199 that is slightly smaller in diameter than the concentrically formed bored opening 192 supporting the stationary sleeve cylinder 195. The centering sleeve 198 is carried for limited axial movement within a tubular spacer sleeve 200 that is retained rightwardly of the sleeve cylinder 195 in the enlarged bored opening 102 by means of a bracket 202 fixedly secured to the front face of the tool change support 90.

By means of this arrangement, it will be apparent that the piston 194 and actuating piston rod 196 are carried for selective movement to one of three operating positions. With pressure fluid admitted via hydraulic line 204, the piston 194 is moved leftwardly as shown in FIG. 5. Whenever line 204 is connected to exhaust and pressure fluid transmitted via line 205, the piston 194 is moved rightwardly in abutting engagement with the end of the centering sleeve 198. To center the piston 194 within its cooperating cylinder 195, both lines 204 and 205 are connected to exhaust and pressure fluid simultaneously admitted to hydraulic lines 206 and 207. As this occurs, the inner ends of both centering sleeves 197 and 198 are moved into abutting engagement with the inwardly extending opposite ends of the sleeve cylinder 195 in a manner to forceably retain the piston 194 in its centered position. The actuating piston 194 is disposed to cooperate with the hydraulic cylinder 92 in a manner to actuate the tool change grip 62 during a tool changing operation.

In addition to limiting the extent of axial movement of the sleeve 198, the bracket 202 secured to the front face of the movable tool change support 86 constitutes the principal support for the tool change grip 62. To this end, the bracket 202 is integrally formed with a forwardly extending tubular support sleeve 211. At its forward end, the tubular support sleeve 211 is provided with a portion of reduced thickness, having three spaced apart axial slots to form three arcuate cam latches 212, 213 and 214 as shown in FIGS. 6 and 7B. The outer ends of the cam latches 212, 213 and 214 are resiliently movable in a radial direction. Three actuating cam levers 216, 217 and 218 are carried for pivotable movement within the three spaced apart slots formed toward the forward end of the tubular support 211 between the arcuate cam latches 212, 213 and 214. Toward their rearward ends, the cam levers 216, 217 and 218 are pivotably carried by pins 219, 220 and 221 secured at the opposite sides of the respective slots to enlarge portions 216a, 217a and 218a of the support sleeve 211. As shown in FIGS. 7A and 7B, the forward outer ends of the cam levers are carried for radial movement with respect to their axes determined by pins 219, 220 and 221.

To effect inward clamping movement of the cam latches 212, 213 and 214, transversely extending actuating pins 223, 224 and 225 are secured to the central portions of the cam levers. It will be apparent that inward pivotable movement of the outer end of cam lever 216 urges the actuating pin 223 into engagement with the arcuate cam latches 213 and 214 to urge these latches inwardly at an appropriate time during the tool change cycle. To effect the appropriate clamping and unclamping movements of the cam latches, the cam levers 216, 217 and 218 are forceably actuated in synchronism by means of an actuating sleeve 228 slidably supported for a limited axial movement by the stationary inner support sleeve 211. Toward its rearward end, as shown in FIGS. 5 and 7C, the actuating sleeve 228 is secured to the outer end of the axially movable piston rod 196 by means of a pin 229. The pin 229 extends through axially extending, diametrically opposed slots 230 and 231 respectively formed in the peripheral wall of the inner support sleeve 211. To support the actuating sleeve 228 for concentric axial movement, a sleeve bearing 234 is fixedly secured to the inner central peripheral wall of the sleeve to slidably engage the central stationary support sleeve 211. It will be apparent that movement of the piston 194 from its retracted leftward position shown in FIG. 6 to its neutral or rightward forward position will effect a corresponding movement of the actuating sleeve 228. During rightward movement of the actuating sleeve 228, a protective bellows 239 interconnected between the bracket 202 and sleeve 228 to constitute a protective enclosure is expanded.

Inasmuch as the support sleeve 211 is immovably secured to the front face of the tool change support 86, selective movement of the actuating sleeve 228 operates to effect the required simultaneous pivotable movement of the actuating cam levers 216, 217 and 218. To accomplish this, the cam levers are respectively provided with radially extending cam arms 236, 237 and 238 which, in turn, are respectively disposed to engage peripherally spaced, axially extending slots 241, 242 and 243 formed in the outer actuating sleeve 228.

Since the piston 194 is movable to three distinct positions with respect to its cooperating sleeve cylinder 195, the actuating sleeve 228 secured to the piston rod 196 is likewise movable to three different positions. Depending upon the selected axial position of the sleeve 228, the cam levers 216, 217 and 218 are likewise movable to one of three positions due to the coaction of the radial cam arms carried thereby with the slots 241, 242 and 243 of the sleeve.

As will hereinafter be more fully described with reference to FIGS. 8A to 8H inclusive, the cam levers 216, 217 and 218 operate to release and engage the clamp ring 117 of the spindle collet 112 at appropriate times during a tool change cycle. In addition, the cam levers operate to release or engage a tool change collet 247 in coordinated relationship with the actuation of the spindle collet 112. The tool change collet 247 comprises four arcuately formed tool securing jaws 250, 251, 252 and 253 respectively carried for resiliently expansible movement by the forward end of a collet support sleeve 254.

Two sleeve bearings 255 and 256 fixedly secured in spaced relationship to an enlarged bored opening 257 within the stationary support sleeve 211 support the tubular collet sleeve 254 for limited axial movement. A spring 260 seated at one end against a centering plug 261 secured within the stationary sleeve 211 engages with its opposite end a flanged centering plug 262 secured within the leftward end of the collet sleeve 256. Thus, the tool change collet 247 and supporting sleeve 256 therefor are normally urged in an outward direction, this movement being limited by engagement of the flanged plug 262 with the end face of the sleeve bearing 255.

As represented in FIG. 6, the tool change support 90 and stationary support sleeve 211 secured thereto are being moved rightwardly toward the spindle collet 112 under control of the hydraulic cylinder 92. During this period of travel, the piston 194, FIG. 5, is urged to its central neutral position by sleeves 197 and 198 to maintain the cam levers in neutral position for engaging the outer face of the collet release ring 117, as shown in FIG. 6. As dynamically represented in FIG. 6, the four jaws of the tool change collet 247 have resiliently snapped into engagement with the forward end of the toolholder and the cam levers have begun to engage the spindle collet clamp ring 117.

Initially, during forward movement of the support 90 from its fully retracted position, as the tool change grip 62 approaches the spindle collet 112, the tool change collet 247 is brought into engagement with the outer end of the toolholder 114. Continued movement of the tool change grip 62 is response to operation of the hydraulic cylinder 92, effects a movement of the individual jaws 250, 251, 252 and 253 into complete engagement with the forward end of the toolholder 114. Engagement of the tool change collet with the forward end of the toolholder 114 is a resilient snap action, during which the individual tool change collet jaws 250, 251, 252 and 253 expand radially outward and then forward to engage an annular latching groove 267 formed toward the forward outer end of the toolholder 114. During the interval in which engagement is taking place, the outer actuating sleeve 228 is retained in its neutral position by the piston 194 in a manner to constrain the cam levers 216, 217 and 218 against outward pivotable movement to be in the neutral position shown in FIG. 6. Thus, the extreme outer ends of the cam levers are actually brought into engagement with the front face of the axially movable spindle collet clamp ring 117 which is represented as retaining the expansible jaws of the spindle collet 112 in clamped engagement with the toolholder 114.

Continued rightward movement of the tool grip 62 from the position shown in FIG. 6 in response to cylinder 92, effects axial releasing movement of the clamp ring 117 in a rightward direction, this movement being limited by the adjusting nut 118 threaded on the outer end of the tool spindle 34. As this movement occurs, the cam latches 212, 213 and 214 are moved forwardly into engagement with annular grooves 270, 271 presented by the tool changer collet jaws 250, 251, 252 and 253. The annular grooves presented by the tool change collet jaws are engaged by corresponding annular locking cams presented by the coacting cam latches. Only the grooves 270 and 271 of the collet jaws 250 and 253 are shown in FIG. 6.

Figure 8A:
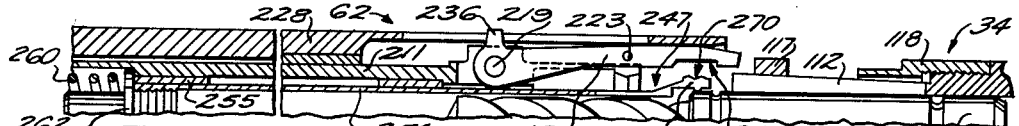
Figure 8B:
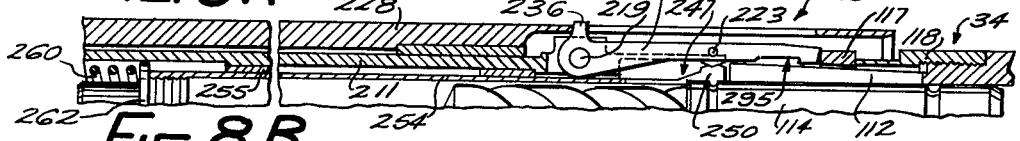

It will be apparent that rightward movement of the tool grip 62 is limited by engagement of the ends of cam levers 216, 217 and 218 with the rightwardly displaced collet clamp ring 117, movement of which is limited by the adjusting nut 118 as shown in FIG. 8B. As the cam levers 216, 217 and 218 are moved to their limit of rightward movement for actuating the clamp ring 117 to disengage the collet 112, the outer actuating sleeve 228 is retained in its neutral position as hereinbefore explained. Thus, the cam levers are likewise retained in a neutral position as represented by the lever 216 in FIG. 6. This is necessary to permit the resilient engagement of the cam latches 212, 213 and 214 into engagement with the annular grooves 270 and 271 respectively, presented by the tool change collet jaws. Inasmuch as the tool change collet is already engaging the toolholder 114, as this occurs, the sleeve bearing 255 is moved rightwardly out of engagement with the now stationary flanged centering plug 262.

Figure 8C:
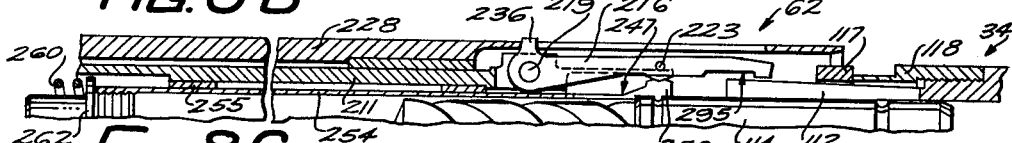
Figure 8D:
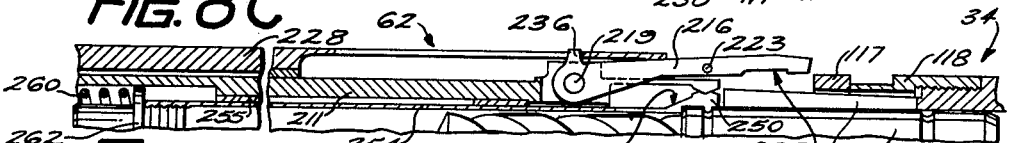
Figure 8E:
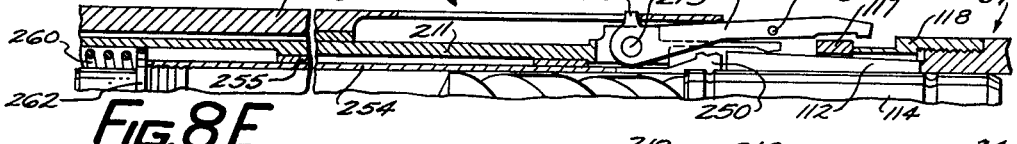
Figure 8F:
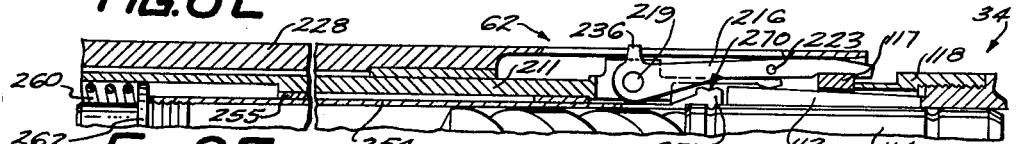

As soon as the clamp ring 117 is moved to the released position represented in FIG. 8B, pressure to the main cylinder 92 is released to preclude frictional resistance during inward radial movement of the outer ends of the cam levers 216, 217 and 218. To retain the jaws of the tool changer collet clamped, the piston 194, FIG. 5, is urged rightwardly in a manner that the axial slots presented by the actuating sleeve 228 urge the cam levers 216, 217 and 218 radially inward, as shown in FIG. 8C. As this occurs, the transverse pins 223, 224 and 225 carried by the cam levers are urged inwardly to maintain the cam latches 212, 213 and 214 in their inner latched positions under pressure. During the tool interchange, hydraulic pressure is maintained to continuously urge the piston 194 in a rightward direction, thereby securely clamping the jaws of the tool change collet 247 into locking engagement with the toolholder 114.

Inasmuch as the spindle release ring 117 is now positioned to release the spindle collet 112 and the tool change collet 247 is positively clamped to the toolholder 114, operation of the cylinder 92 is reversed to effect bodily withdrawal of the toolholder 114 from the spindle 34. Thus, during a tool interchange, all of the tools respectively carried by the spindles 34 to 45, inclusive, FIG. 1, are simultaneously withdrawn by retracting movement of the movable tool change support 90. After complete withdrawal, the hydraulic cylinder 69 is actuated to move the tool change mechanism 63 from the "B" to the "A" position in front of the empty storage magazine 60. Thereupon, with the changer support base 86 latched in this position the hydraulic cylinder 92 is again actuated to effect forward movement of the support 90 together with the individual tool grips 62 for inserting the withdrawn tools into the empty storage sockets 59. During insertion, the piston 194 is maintained in its rightward position and the respective toolholders are positively clamped in each of the tool grips 62. To positively retain the toolholders in the storage sockets, a plurality of spring biased detent plungers, such as 281 and 282 in FIG. 12A, are radially disposed about each of the storage sockets 59 in the storage magazine section 60. Detents 281 and 282 are carried for radial slidable movement and are normally urged inwardly by means of springs 283 and 284 abutting with their opposite ends threaded plugs 285 and 286. The springs 283 and 284 are disposed to urge the detent plungers 281 and 282 inwardly with a force greater than that of the unclamped resiliently movable jaws of the tool change collet 247.

Upon insertion of the toolholder 114 into the empty storage socket 59, the detent plungers 281 and 282 are forced outwardly to permit insertion of the toolholder. As soon as the toolholder 26 is fully seated within the socket, the detent plungers are urged inwardly to engage an annular detent groove 289 formed toward the rearward portion of the toolholder. Thereupon, the piston 194 is returned from its rightward to its neutral position to permit return movement of the cam levers 216, 217 and 218 to neutral position. Movement of the cam levers radially outward to neutral position removes the clamping pressure exerted against the cam latches 212, 213 and 214 which are then free for subsequent radially outward movement from the annular grooves presented by the collet jaws 250, 251, 252 and 253, inclusive.

Hydraulic cylinder 92, FIG. 1, is then actuated to retract the multiple tool change support 90 together with the individual grips 62 to the position shown in FIG. 1. Initially, upon retracting movement of the support 90, the individual cam latches move radially and axially out of engagement with the annular grooves formed in the respective jaws of the tool change collet 247. With the cam latches unsnapped from engagement with the collet jaws, axial retracting movement continues although the collet 247 momentarily is retained in engagement with the annular detent groove 267 in the toolholder 114. As soon as the flanged plug 262, FIG. 5, is engaged by the sleeve bearing 255 secured within the retracting tubular support sleeve 211, the collet jaws are moved radially and axially out of engagement with the annular detent groove 267 as shown in FIG. 12A. Since the resilient pressure exerted by magazine section springs 283 and 284 is greater than that presented by the resilient jaws of the now unclamped tool change collet 247, the toolholder 114 remains seated in the storage socket 59.

With the previously used tools now gripped within the storage sockets 59, the movable support 90 is fully retracted and the storage magazine indexed to present the next selected set of tools, to the empty tool changer collets 247. The support 90 and tool grips 62 are then again actuated by coordinated operation of cylinder 92 and piston 194 to grip the next set of tools in the changer collets 247. After the new set of tools is positively clamped in the tool changer collets 247, the cylinder 92 is again actuated to withdraw the new set of tools to the retracted position.

With the next selected set of tools in the fully retracted changer support 90, the base 86 is again unlatched from the supporting frame 67 and bodily displaced to the "B" position in alignment with the empty tool spindles. Initially, upon arrival in the "B" position, the changer base 86 is latched to the supporting frame 67 and the movable support 90 again urged inwardly in response to operation of the hydraulic cylinder 92. During this interval, the small pistons 194 respectively associated with the individual grips 62 are maintained in their rightward positions in a manner to positively lock each of the tools in its associated individual tool change grip 62. At this moment, therefore, the tool changer collet support tube 254 is fixedly locked in a leftwardly displaced position with respect to the left end face of the sleeve bearing 255. This is due to the fact the cam latches 212, 213 and 214 are respectively retained in locking engagement with the annular grooves presented by the collet jaws 250, 251, 252 and 253 by means of the actuating pins carried by the inwardly urged cam levers 216, 217 and 218 as shown in FIG. 8C. As there indicated, the flanged centering plug 262 is maintained in a like leftwardly displaced position relative to the sleeve bearing 255 in opposition to the spring 260.

As soon as the toolholder 114 is fully seated within the spindle collet 112, FIG. 8B, the actuating sleeve 228 is urged to fully retracted position by corresponding leftward retracting movement of the piston 194, FIG. 5. Thereupon, the cam levers 216, 217 and 218 are pivoted radially outward as a prerequisite to effecting reengagement of the collet clamp ring 117. Immediately prior to leftward movement of piston 194, FIG. 5, the inward actuating pressure from cylinder 92 is momentarily interrupted. The interruption of pressure to cylinder 92, FIG. 5, prevents frictional engagement between the outer ends of cam levers 216, 217 and 218 with the front face of the spindle collet clamp ring 117 during radial outward movement of the cam levers. Thus, with pressure to the cylinder 92 momentarily interrupted, leftward retracting movement of piston 194, FIG. 5, effects immediate radial outward movement of the outer ends of the cam levers 216, 217 and 218. As soon as the levers have moved outwardly to the position indicated in FIG. 8D, inward pressure to cylinder 92 is reestablished to effect additional forward movement of the support sleeve 211 for advancing the cam levers 216, 217 and 218 to the positions represented in FIG. 8E. As there shown, a cam notch 295 formed in the inner face of the cam lever 216 is positioned radially outward with respect to the side faces of the spindle collet clamp ring 117. Although not shown in the diagrammatic views in FIGS. 8A to 8H, inclusive, the actuating cam levers 217 and 218 are provided with identically spaced cam notches, and cooperate with the cam notch 295 of cam lever 216 in a manner simultaneously to engage the spindle collet clamp ring 117.

Upon radial outward movement of the cam levers, the cam latches 212, 213 and 214 are released from locking engagement with the annular grooves presented by the tool changer collet jaws 250, 251, 252 and 253. During the additional rightward forward advancement of the central support sleeve 211, therefore, the respective cam latches 212, 213 and 214 integrally formed therewith are likewise moved forwardly out of engagement with the annular grooves presented by the tool change collet jaws. During this interval, however, the spring 260 is further compressed to resiliently maintain the toolholder 114 fully seated within the spindle collet 112. Thus, even though the tool changer collet 247 is now in unclamped position with respect to the toolholder 114, it continues to function to retain the tool holder in proper position. The spring 260 and tool change collet 247 cooperate to maintain the toolholder in its proper position during the subsequent reengagement of the tool spindle clamp ring 117.

To accomplish this, the piston 194 is moved to its neutral position in alignment with the cylinder sleeve 195, FIG. 5, to effect a corresponding movement of the actuating sleeve 228. As this occurs, the inner periphery of the forward end of the actuating sleeve 228 is moved rightwardly to simultaneously urge the three cam levers 216, 217 and 218 inwardly. Thereupon, the cam notches presented by the three cam levers 216, 217 and 218 are moved into engagement with the spindle collet clamp ring 117. This condition is diagrammatically illustrated in FIG. 8F, in which the cam notch 295 presented by the actuating lever 216 is moved into engagement with one portion of the spindle collet clamp ring 117.

Figure 8G:
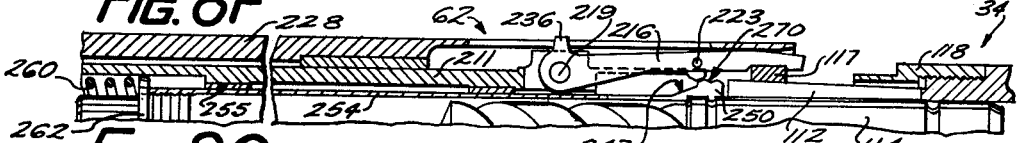

As soon as this occurs, the cylinder 92, FIG. 5, is actuated to effect outward retracting movement in a manner that the inwardly constrained cam levers operate to effect corresponding leftward clamping movement of the ring 117 into engagement with the tapered shank of the spindle collet 112. The jaws of the spindle collet 112 are then forced inwardly into tight clamping engagement with the periphery of the toolholder 114, as shown in FIG. 8G. During reengagement of the clamp ring 117, the piston 194 is maintained in its neutral position to maintain the actuating sleeve 228 in the positions represented in FIGS. 8F and 8G. With the three cam levers 216, 217 and 218 thus constrained in their neutral radially spaced positions, the three actuating pins 223, 224 and 225 are spaced radially outward with respect to the resiliently expansible cam latches 212, 213 and 214. This permits the cam latches to expand radially during leftward reclamping movement of the stationary support sleeve 211 in response to actuation of the cylinder 92. The radial resilient movement of the cam latches 212, 213 and 214 permits leftward retracting movement of these latches radially and axially past the jaws of the tool change collet 247 which is continuously maintained in its rightward position due to operation of the spring 260. It is emphasized that the peripheral faces of the tool changer collet jaws constitute arcuately formed, angular cam faces configured to permit leftward retracting movement of the expansible cam latches 212, 213 and 214 during leftward reclamping movement of the spindle clamp ring 117. It is likewise emphasized, that the spring 260 urges the tool change collet 247 rightwardly with sufficient force to maintain the toolholder 114 fully seated within the spindle collet 112 during leftward reclamping movement of the clamp ring 117.

As will hereinafter be more fully explained, the cylinder 92, FIG. 5, is operative to urge the support 90 and clamp ring 117 leftwardly to effect positive reclamping operation of the spindle collet 112. As soon as the spindle collet 112 is reclamped in response to leftward movement of the clamp ring 117, the retracting pressure to the cylinder 92 is interrupted. This releases the frictional engagement between the rightward face of the clamp release ring 117 and the three cam notches respectively presented by the cam levers 216, 217 and 218. Thereupon, the piston 194 is urged leftwardly to its rearward position as shown in FIG. 5 to effect corresponding movement of the actuating sleeve 228. Leftward movement of the actuating sleeve 228 with respect to the stationary support sleeve 211, in turn, effects radially outward pivotable movement of the cam levers 216, 217 and 218 for moving the cam notches radially out of engagement with the clamp ring 117.

Figure 8H:
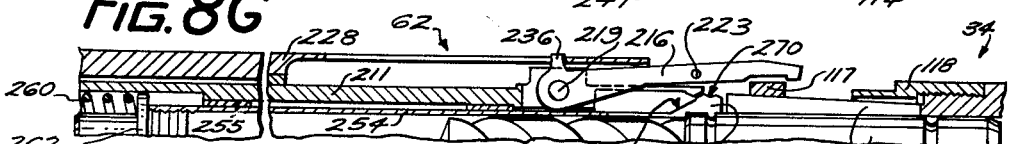

With the cam levers disengaged from the clamp ring 117, as shown in FIG. 8H, it will be apparent that the resiliently expansible jaws of the tool change collet 247 are still maintained in engagement with the annular groove 267 presented by the toolholder 114. Inasmuch as the toolholder 114 is now fully clamped within the contracted spindle collet 112, FIG. 8H, the jaws of the tool change collet 247 are now free to expand radially upon the subsequent reapplication of retracting pressure to the main cylinder 92. Thus, with the cam levers 216, 217 and 218 pivoted radially outward, the cylinder 92 is reactivated to effect complete retracting movement of the tool change support 90 to its position represented in FIG. 5 upon the base 86. During retracting movement of the support 90, the individual tool change grips, such as the grip 62, are moved out of engagement with the respective tools and toolholders now clamped in the respective spindle collets.

During retracting movement of the empty multiple tool change support 90, the tool change collet 247 is retained in engagement with the toolholder 114 momentarily, until the flanged centering plug 262 is reengaged by the left face of the sleeve bearing 255 fixedly secured to the support sleeve 211, FIG. 6. As soon as the flanged plug 262 is engaged by the sleeve bearing 255, the jaws of the tool change collet 247 expand slightly due to the camming action effected by the annular groove 267 in the toolholder 114. Since the tool change collet jaws are not constrained against radial outward movement, they are completely disengaged from the tool holder 114.

As hereinbefore explained, whenever the tool spindles have been returned and clamped in their home positions as shown in FIG. 1, a multiple tool interchange may be effected between the spindles carried by the spindle head 27 and the storage magazine 58. The sequence of steps require to effectuate a complete multiple tool interchange are identified in the chart in FIG. 4A. The successive steps represented in FIG. 4A illustrate the correlation between the electrical control circuit shown in FIG. 10 and the schematic hydraulic control circuit shown in FIG. 9.

As shown in FIG. 9, hydraulic fluid is withdrawn from a sump 303 contained within the machine frame 67 by means of a pump 304 driven by a motor 305. From a pump 304, hydraulic fluid under pressure is transmitted via a flexible line (not shown) to a main pressure supply line 306 in the tool change support base 86. To maintain proper operating pressure within the main supply line 306, there is provided the usual pressure relief regulating valve 309 connected in well known manner to return excess fluid to the sump 303. Pressure fluid from the hydraulic control system for actuating the multiple tool change mechanism is returned via a main exhaust line 310 and a branch line 311 to the sump 303. With the motor 305 operating to drive the pump 304, fluid pressure is supplied to the main supply line 306 and the multiple tool change mechanism is activated for operation. For positioning and retaining the tool change mechanism 63 in the "A" position or the "B" position, FIG. 1, a pair of spaced apart indexing notches 312 and 313 are formed in the base 67 as shown in FIG. 9. As there shown, a shot bolt 314 carried by the tool changer support base 86 is engaging the notch 312 for maintaining the entire tool change mechanism in the "A" position. The shot bolt 314 is carried by a piston 316 reciprocably carried within a hydraulic cylinder 317. Whenever the shot bolt 314 engages one or another of the index notches 312 or 313, a dog secured to the shot bolt 314 activates a sequencing limit switch 318. Rightward movement of the piston 316 to retract the shot bolt 314 causes movement of the dog secured thereto to deactuate the limit switch 318 and activate a sequencing limit switch 319.

A control valve 322 is operatively connected to control movement of the piston 316 for effecting retracting or reengaging movement of the shot bolt 314. Energization of a valve solenoid 323 effects rightward movement of a valve spool 324 to interconnect the main pressure supply line 306 via a valve spool cannelure 325 to a branch supply line 326. A flow of fluid under pressure from branch line 326 effects rightward movement of the piston 316 to retract the shot bolt 314, with pressure fluid being exhausted via a branch line 328 connected via valve spool groove 329 to the main exhaust line 310.

For effecting movement of the shot bolt 314 into engagement with an indexing notch, as shown in FIG. 9, a solenoid 331 is energized to effect movement of the valve spool 324 to its leftward position. Leftward movement of the valve spool 324 interconnects the pressure supply line 306 directly to the branch line 328 for effecting leftward inward movement of the piston 316. At the same time, fluid is exhausted from the opposite side of the piston 316 by branch line 326 which is then connected via a valve spool groove to the main exhaust line 310.

Whenever the shot bolt 314 is moved rightwardly to retracted position, the tool change support base 86 is longitudinally movable along the main frame ways 64 and 65 by operation of the hydraulic cylinder 69. The longitudinally movable support base 86 is connected to a piston rod 70 under control of a piston 333 movable within the cylinder 69 in response to a control valve 334. After the shot bolt 314 is disengaged from the indexing notch 312, the base 86 is movable to the "B" position by energizing a solenoid 336 associated with the control valve 334. Energization of the solenoid 336 effects rightward movement of a valve spool 337 in opposition to a centering spring 338. With the valve spool 337 in rightward position, the pressure supply line 306 is connected via a valve spool cannelure 341 to a branch line 342 to effect upward movement of the piston 333 for moving the support base 86 from the "A" to the "B" position. At the same time, the control cylinder 69 is connected via a branch line 343, a valve spool groove 344 of the rightwardly moved valve spool 337 to the main exhaust line 310. Movement of the tool change support base 86 longitudinally effects corresponding movement of an actuating dog 347 fixedly secured thereto into position to activate a sequence limit switch 348. The limit switch 348 is fixedly secured to the main supporting frame 67 in spaced relationship to a limit switch 349 secured to the frame. The limit switches 348 and 349 are spaced apart a distance corresponding to the spacing of the indexing notches 312 and 313 presented by the supporting frame 67. Upon arrival of the base 86 in the "A" position, the limit switch 348 is activated to effect deenergization of the control valve solenoid 336 permitting return movement of the valve spool 337 to the central neutral position represented in FIG. 9. Whenever the solenoid 336 and a solenoid 351 of the valve 334 are deenergized, the valve spool 337 is centered between the spring 338 and a spring 352 in well known manner. Movement of the valve spool 337 to its resiliently centered neutral position, as shown in FIG. 9, effects a connection of both branch lines 342 and 343 to the main exhaust line 310. With this condition existing, the piston 333 of the hydraulic cylinder 69 is free to move axially upon a leftward inward movement of the shot bolt 314 into the associated beveled indexing notch, 312 or 313. Thus, reengagement of the shot bolt 314 with one of the index notches effects final precise longitudinal movement of the tool change mechanism 63, FIG. 1, in either of the preselected positions.

For moving the tool change support base 86 longitudinally toward the "B" position, solenoid 351 is energized to effect leftward movement of the valve spool 337 in opposition to the centering spring 352. The leftward movement of the valve spool 337 effects a connection between the pressure supply line 306 and a valve spool groove 354 to the branch supply lines 343. Hydraulic fluid under pressure from branch supply lines 343 effects downward movement of the piston 333 to its position indicated in FIG. 9, with fluid being exhausted from the cylinder 69 via branch line 342 and a valve spool groove 355 to the main exhaust line 310.

For effecting transverse movement of the tool change support member 90, relative to its supporting base 86, there is provided a control valve 358. As shown in FIG. 9, a valve spool 359 of control valve 358 is maintained in a central neutral position between centering springs 360 and 361 to interconnect the main exhaust line 310 via a valve spool groove 362 to branch lines 364 and 365 respectively. At their opposite ends, the branch lines 364 and 365 are connected to the opposite ends of the cylinder 92 and at the opposite sides of a piston 366 carried by the cylinder.

For indicating the transverse position of the multiple changer support 90, three trip dogs 369, 370 and 371 secured thereto are respectively disposed to coact with limit switches 373, 374 and 375 secured to the base 86. For effecting movement of the changer support 90 to its rearward fully retracted position, a solenoid 377 is energized to effect leftward movement of the valve spool 359 in opposition to the spring 360. Leftward movement of the valve spool 359 effects a connection of the main pressure supply line 306 via a valve spool cannelure 378 to the branch line 365 connected at its opposite end to effect leftward retracting movement of the piston 366. Upon movement of the changer support 90 to its fully retracted position, the dog 369 secured thereto actuates the limit switch 373.

As will hereinafter be more fully explained, a pressure switch 379, although activated, performs no function during full retracting movement of the changer support 90. The pressure switch 379 is disposed to be operative only during a limited retracting movement of the changer support 90 for reengaging the spindle clamp ring 117, FIGS. 3 and 6. During either complete or limited retracting movement of the piston 366, fluid is exhausted from the cylinder 92 via a branch line 364 connected via valve spool groove 380 of the leftwardly positioned valve spool 359 to the main exhaust line 310.

During forward or rightward movement of the changer support 90, the piston 366 is urged rightwardly to one of two different positions corresponding generally to the slightly difference in spacing between switches 374 and 375 relative to their associated actuating dogs 370 and 371. The extent of forward movement of the changer support 90 depends upon the particular step in the tool interchange sequence. In either case, this movement is effected by energizing a solenoid 383 to effect rightward movement of the valve spool 359 in opposition to the spring 361. Energization of the solenoid 383 operates to effect a connection of the pressure supply line 306 via a valve spool groove 384 to the branch supply line 364 connected to effect rightward movement of a piston 366 and corresponding movement of the changer support 90. At the same time, fluid is exhausted from the opposite side of the piston 366 via the branch line 365 and a valve spool groove 385 connected to the exhaust line 310. Depending upon the step in the multiple tool interchange, the solenoid 383 is deenergized to stop rightward pressure via the branch line 364 upon activation of the limit switch 374 by the dog 370, or a slightly later activation of the limit switch 375 by the dog 371. In either case, deenergization of the solenoid 383 permits resiliently biased return movement of the valve spool 359 to its neutral position thereby connecting the main exhaust line 310 via the common valve spool groove 362 to both of the branch supply lines 364 and 365. As this occurs, a rightward or forward pressure to the piston 366 is stopped and movement of the multiple tool change support 90 in a forward direction is likewise stopped.

Movement of the piston 194 to its neutral position for effecting corresponding movement of the actuating sleeve 228 to neutral position, is effected by a solenoid valve 386. The valve 386 is provided with a valve spool 387 normally biased to its leftward position by means of a spring 388, as shown in FIG. 9. With this condition existing, a cannelure 389 formed in the valve spool 387 is interconnected between the main exhaust line 310 and the branch line 206. As shown in FIG. 9, the centering sleeve 197 is carried for axial movement within the cooperating cylinder 199. The centering sleeve 198 is supported for axial slidable movement within the cylinder 392 formed by the inner periphery of the stationary spacer sleeve 200, as shown in FIG. 5. Whenever the branch line 206 is connected to exhaust, the outward ends of cylinders 199 and 392 are likewise connected to exhaust by means of the line 206 and the interconnecting line 207 as schematically shown in FIG. 9. With this condition existing, the piston 194 is movable in either a leftward or a rightward direction from its neutral position.

For urging the piston 194 to its neutral position, a solenoid 393 is energized to effect rightward movement of the valve spool 387 in opposition to the spring 388. Thereupon, the main pressure supply line 306 is connected via the cannelure 389 of the rightwardly moved valve spool to the branch line 206. Fluid under pressure from line 206 to the leftward end of the cylinder 199 is transmitted via line 207 to the rightward end of the cylinder 392 effecting simultaneous inward movement of both centering sleeves 197 and 198. Thereupon, the piston 194 is maintained in its central neutral position to in turn maintain the actuating sleeve 228 in its neutral position. Upon arrival of the piston 194 at its neutral position, a pressure switch 394 interconnected in the branch supply line 206 is activated.

Whenever the solenoid 393 of valve 386 is deenergized, a control valve 396 may be operated to effect either leftward retracting movement of the piston 194 or rightward outward movement of the piston, together with a corresponding movement of the actuating sleeve 228. As shown in FIG. 9, an axially movable valve spool 397 of the control valve 396 is normally maintained in a central neutral position by means of centering springs 398 and 399. With the valve spool 397 retained in its neutral position, a common cannelure 402 formed therein is interconnected between the main exhaust line 310 and branch supply lines 204 and 205. With lines 204 and 205 connected to exhaust, as shown in FIG. 9, the control valve 386 is operable to effect movement of the piston 194 to its central neutral position.

To move the piston 194 in a rightward or forward outward direction, a solenoid 403 is energized to effect axial movement of the valve spool 397 in opposition to the spring 398. Thereupon, the pressure supply line 306 is connected via a valve spool groove 404 to the branch line 205 connected to effect rightward movement of the piston 194 and corresponding rightward outward movement of the actuating sleeve 228. Deenergization of the solenoid 403 is effected by activation of a pressure switch 405 upon arrival of the actuating sleeve 228 at the required position in the tool change cycle. Whenever the piston 194 is moved rightwardly, the cylinder 392 is connected to exhaust via the line 204 and a line 406 in the valve spool 397 to the exhaust line 310.

To effect leftward or retracting movement of the piston 194 relative to the movable support 90, a solenoid 409 is energized to effect movement of the valve spool 397 in opposition to the spring 399. With the valve spool 397 moved in opposition to the spring 399, the pressure supply line 306 is connected via a valve spool groove 410 to the branch line 204 connected to effect leftward retracting movement of the piston 194. At the same time, the cylinder 199 at the opposite side of the piston 104 is connected via the branch line 205 and the valve spool groove 411 to the main exhaust line 310. Deenergization of the solenoid 409 to limit the extent of leftward movement of the piston 194 is effected by activation of a pressure switch 402 interconnected in the line 204.

The control system schematically represents the operation of the hydraulic control circuit to effect movement of the actuating sleeve 228 to one of three distrinct operating positions. It will be apparent that the actuating sleeves respectively associated with the other nine tool change grips are operated in synchronism with the sleeve 228. Thus, movement of all of the actuating sleeves associated with the ten individual tool change grips are operated by selective activation of the control valve 386 and the control valve 396. To this end, as represented in FIG. 9, the branch line 206 from the control valve 386 is schematically represented as being interconnected by a branch line 415 to the nine actuating cylinders 416 respectively associated with the other nine tool change grips carried by the movable tool change support 90. Likewise, branch supply lines 204 and 205 are interconnected by branch lines 417 and 418 to the respective actuating cylinders 416 in a manner similar to the interconnection of the branch lines 204 and 205 to the cylinders 199 and 392 respectively.

To effect a complete tool interchange between the spindle head and the tool storage magazine, it is necessary that the support plate 77 for the magazine 58, FIG. 11, be indexed in coordinated relationship with the opera- of the tool change mechanism 63. The hydraulic control circuit for effecting this result is represented in FIG. 11. As thereshown, the motor 305 within the base is connected to drive a pump 422 which is operable to withdraw hydraulic fluid from a sump 423, transmitting it to a main pressure supply line 425. The pressure supply line 425 is connected to supply hydraulic fluid under pressure both to the indexing mechanism for the storage magazine 58, as well as the clamp mechanisms associated with the spindle support arms. Pressure fluid from this control system is exhausted via a return line 426 connected via a branch line 427 to return fluid to the sump 423.

As a prerequisite to effecting indexable movement of the support plate 77, it is necessary to withdraw the shot bolt 64A from engagement with one or another of a plurality of indexing notches presented in the support plate 77. To accomplish this, solenoid 481, FIG. 11, is energized to effect leftward movement of the valve spool 480. Thereupon, the pressure supply line 425 is connected via a valve spool cannelure 428 to a branch line 429 that is connected to effect rightward retracting movement of the piston 465A. Upon withdrawal of the shot bolt 464A in response to rightward movement of the piston 465A, the support plate 77 may be indexably advanced under the control of the valve 452. Upon withdrawal of the shot bolt 464, the opposite end of the cylinder 466A is connected to exhaust via a return line 430 and thence via a valve spool groove 431 of the leftwardly moved valve spool 480 to the main exhaust line 426. Whenever the shot bolt 464A is disengaged from the support plate 77, a dog 474 secured to the shot bolt activates a sequence limit switch 476.

To effect reengagement of the shot bolt 464A, solenoid 485 is energized to effect rightward movement of the valve spool 480. Thereupon, the pressure supply line 425 is connected via a valve spool groove 433 directly to branch line 430. With pressure fluid flowing through the line 430, the piston 465A urges the shot bolt 464A into engagement with the support plate 77, effecting final positioning movement thereof. With this condition existing, the dog 474 engages the limit switch 475, as hereinbefore described. With the shot bolt 464A in leftward engaged position, the fluid is exhausted from the leftward end of the cylinder 466A via the branch line 429 connected by a valve spool groove 434 to the main exhaust line 426.

At the time an indexable movement of the storage magazine 58 is to be initiated, the control piston 450 is in its leftward position with respect to the cylinder 451 to effect retracting movement of the pawl mechanism 437 diagrammatically represented in FIG. 11. With the pawl mechanism 437 moved leftwardly, the pawl is adapted to engage a gear 438 secured to a drive gear 439 having meshing engagement with the gear 440 connected to effect rotational movement of the support plate 77.

The pawl mechanism 437 is illustrative of any well known device to effect a single step advancement of the storage magazine 58 in response to activation of the control valve 452. It will be readily apparent that other devices may be substituted for the pawl mechanism 437 to effect either a single step advancement of the support plate 77, or to effect a selective advancement thereof for positioning any one of the tool storage sections in front of the tool change mechanism 63, FIG. 1.

As shown in FIG. 11, whenever the shot bolt 464A is withdrawn and the piston 450 reset in its leftward position, solenoid 460 is energizable to effect leftward movement of the valve spool 453 to initiate an index movement of the support plate 77. Upon leftward movement of the valve spool 453 in opposition to the spring 456, the main pressure supply line 425 is connected via a valve spool groove 443 to transmit pressure fluid to a branch line 444. The flow of fluid under pressure from branch line 444 effects rightward movement of the piston 450 to actuate the pawl mechanism 37 for effecting a single step advancement of the index plate 77. With the piston 450 moved rightwardly, the dog 464 activates the sequential limit switch 466. At the same time, the opposite end of the cylinder 451 is connected via a branch line 445 and a valve spool groove 446 to the main exhaust line 426.

After an indexable movement of the support plate 77 has been effected and the shot bolt 464A reengaged, a solenoid 461 is energized to effect rightward movement of the valve spool 453 for resetting the pawl mechanism 437, in preparation for the next selected indexable movement. Energization of the solenoid 461 effects rightward movement of the valve spool 453 in opposition to the centering spring 457. With this condition existing, the main pressure supply line 425 is connected via a valve spool groove 448 to the branch line 445 to effect leftward movement of the piston 450 and resetting of the pawl mechanism 437. At this time, the dog 464 is moved into a position to activate the sequence limit switch 465, and the branch line 444 is connected to exhaust via a valve spool groove 447. With both solenoid 460 and 461 deenergized, the valve spool 453 is moved to a central neutral position in well known manner by means of centering springs 456 and 457 to completely interrupt the flow of pressure fluid from the line 425 and the flow of return fluid to the exhaust line 426.

Whenever a multiple tool change is to be effected, as hereinbefore explained, the tool spindles are moved to their "home" positions and the stationary pivot clamps and bridge clamps respectively associated with the spindle holders are urged into clamped positions. Whenever the tool spindles are to be repositioned, the spindle clamping control circuit schematically represented in FIG. 11 is activated. Unclamping of the bridge clamp 160 is effected by energizing a control valve 486, FIG. 11. To accomplish this, a solenoid 487 is energized to effect rightward movement of an associated valve spool 488 in opposition to the spring 489. With the valve spool 488 moved rightwardly, the pressure supply line 425 is connected via a valve spool groove 492 to a branch line 493. Fluid pressure from the line 493, in turn, effects leftward movement of the piston 172 and via line 50, to piston 173. Movement of the pistons, in turn, effects leftward movement of the bridge clamp 160 to compress the Belleville springs 163 and 164. During this condition, fluid is exhausted from the opposite ends of the cylinders 170 and 171 via lines 494 and 495, the latter being connected via a valve spool groove 496 of the rightwardly moved valve spool 488 to the main exhaust line 426.

To reclamp the bridge clamp 160, the solenoid 487 is deenergized to permit leftwardly biased movement of the valve spool 488 in response to operation of the spring 489. Thereupon, the main pressure supply line 425 is connected via a valve spool groove 498 directly to the line 495. Thereupon, with fluid pressure directed to lines 495 and 494, the pistons 172 and 173 are urged rightwardly to permit reengagement of the bridge clamp 160 in response to Belleville springs 163 and 164. Pressure fluid is then exhausted from the cylinders 170 and 171 by means of branch line 502 and the branch line 493, the latter being connected via a cannelure 503 of the leftwardly moved valve spool 488.

To release the pivot clamp 125, a solenoid 505 of a control valve 506 is energized. Energization of the solenoid 505 effects rightward movement of the valve spool 507 in opposition to a spring 508. Whenever the valve spool 507 is moved rightwardly, the pressure supply line 425 is connected via a valve spool groove 511 to a branch line 512 connected to effect leftward movement of the piston 514 to compress the Belleville spring 132. With this condition existing, the cylinder 138 is connected to exhaust via a branch line 515 and a valve spool groove 516 to the main exhaust line 426.

To reengage the stationary clamp 125, the solenoid 505 is deenergized to permit leftward movement of the valve spool 507 in response to the spring 508. As this occurs, the pressure supply line 425 is connected by a valve spool groove 520 to the branch line 515 to urge the piston 514 rightwardly, as shown in FIG. 11. Thereupon, the opposite end of the cylinder 138 is connected via branch line 512 and a valve spool groove 521 to the main exhaust line 426.

In a similar manner, the pivot clamps 180 and 187 are disengaged by compressing Belleville springs 181 and 188 by operation of solenoid valves 523 and 524 respectively. To release the pivot clamp 180, a solenoid 525 is energized to effect rightward movement of a valve spool 526 in opposition to a spring 527. With the valve spool 526 moved rightwardly, the pressure supply line 425 is connected via a valve spool groove 529 to a branch line 530 connected to effect leftward movement of a piston 531. Fluid pressure from cylinder 182 is exhausted via a branch line 532 connected by a cannelure 533 to the exhaust line 426.

Reengagement of the pivot clamp 180 in response to Belleveville spring 181 is effected by the deenergizing the solenoid 525 to permit leftward resiliently biased movement of the valve spool 526. Thereupon, the pressure supply line 425 is connected directly to the branch line 532 to effect rightward disengaging movement of the piston 531.

To release the pivot clamp 187, a solenoid 535 of the valve 524 is energized to effect rightward movement of the valve spool 536 in opposition to a spring 537. Rightward movement of the valve spool 536 interconnects a cannelure 539 thereof between the pressure supply line 425 and a branch line 540 to effect leftward movement of the piston 541 to compress the Belleville spring 188. Thereupon, the opposite end of the cylinder 189 is connected via a branch line 544 and a valve spool groove 545 to the exhaust line 426. Upon deenergization of the solenoid 535, the valve spool 536 is urged leftwardly by the spring 537. Leftward movement of the valve spool 536 interconnects the pressure supply line 425 via a valve spool groove to the line 544 connected to effect rightward retracting movement of the piston 541. Thereupon, the spring 188 is operative to effect reengagement of the pivot clamp 187.

The main pressure supply line 425 is connected to similar spindle support arm clamping systems 547, 548 and 549 which are likewise connected to the main exhaust line 426 as schematically represented in FIG. 11. The clamping system 547 is operative to clamp the respective spindle support holders extending through the expansible clamping slot 48, FIG. 1; the clamping system 548 is operative to activate the individual pivot clamps and bridge clamps associated with the expansible clamping slot 49; and, the clamping system 549 is operative to selectively activate the individual pivot clamps and the bridge clamp associated with the expansible clamping slot 50.

To activate the machine for operation, it is necessary to energize an electrical control circuit respectively shown in FIGS. 10 and 12. As shown in FIG. 12, current from the usual three phase source 551 is transmitted via a selectively actuatable fused disconnect switch 552 operable to energize conductors L1, L2 and L3. Supply conductors L1 and L2 are connected to energize a transformer 553 connected to supply current of reduced voltage to conductors 554 and 555 for energizing the control circuit. With the transformer 553 energized, a master start button switch 558 is momentarily depressed to complete a circuit for energizing a master start relay 559. This starting circuit is completed from energized conductor 554 along a line 8A and via a normally closed start button switch 560 to a conductor 561. Energization of the relay 559 completes a seal-in circuit along line 9A and a now closed contact 559–9A of the relay 559 to a conductor 562. With the relay 559 energized to closed position, a normally open contact 559–8A is retained in closed position to complete a circuit from energized conductor 555 to a conductor 565. With the relay 559 energized to closed position, the conductors 554 and 565 are connected to effect energization of the spindle holder clamping circuits represented in FIG. 12 as well as the multiple tool change circuit represented in FIG. 10. Energization of relay 559 likewise effects closure of associated contacts 559–4A, 559–5A, 559–6A to transmit power from the supply lines L1, L2 and L3 to energize the pump drive motor 305.

It will be apparent, that energization of the relay 559 conditions the control circuit for activating the pivot and bridge clamp mechanisms for the spindle holders, as well as effecting a multiple tool change. This is due to the fact that conductors 554 and 564 effect energization of the circuit, FIG. 10.

With the relay 559 energized, the feed motor 28 and spindle drive motor 54 may be energized by momentarily depressing a start button switch 568. Depressing the start switch 568 completes a circuit along the line 10A via a normally closed stop switch 569 to a conductor 570 and thence through the momentarily closed switch 568 to energize a motor control relay 571 connected at its opposite terminal to the energized conductor 565. Energization of relay 571 completes a seal-in circuit upon closure of an associated contact bar 571–11A to a conductor 573. Energization of relay 571 likewise effects closure of associated contacts 571S and 571F for effecting energization of the spindle drive motor 54 and the feed drive motor 28 respectively.

Even though the feed motor 28 and spindle motor 54 are energized to rotate, feed movement of the spindle head and rotational movement of the tool spindles may be stopped by means of the usual disconnect clutches (not shown) to facilitate a multiple tool change operation.

The electrical control system for activating the bridge clamp 160, and pivot clamps 125, 180 and 187 (FIG. 11) is represented in FIG. 12 within the phantom dotted line rectangle 575. Separate identical control systems within the solid line rectangles 577, 578 and 579 in FIG. 12 are operative in a manner similar to the control system 575 for actuating the respective hydraulic clamping systems 547, 548 and 549 schematically represented in FIG. 11. All of the electrical control systems for the various pivot and bridge clamps are interconnected between the energized conductor 565 and an energized conductor 581. As shown in FIG. 12, the energized conductor 554 is interconnected by means of a normally closed clamping switch 582 to energize the common conductor 581. By means of this arrangement, depressing the normally closed stop button switch 582 will simultaneously effect engagement of all of the pivot and bridge clamps associated with the spindle support holders 36 to 45, inclusive, FIG. 1.

The energized conductor 581 is interconnected by means of a normally closed clamp switch 584 to energize a common conductor 585.

To energize the solenoid 487 for releasing the bridge clamp 160, FIGS. 11 and 12, a push button switch 586 is momentarily depressed completing a circuit from energized conductor 585 and a normally closed switch 587 to energize a relay 588. Energization of the relay 588 effects closure of a normally open contact 588–17A to complete a seal-in circuit. With relay 588 retained in energized condition, another contact 588–24A is closed to complete a circuit along a line 24A to energize the solenoid 487.

In a similar manner, a solenoid 505 in line 25A for releasing pivot clamp 125 may be energized by momentarily depressing a switch 590. Closure of switch 590, FIG. 12, completes a circuit along line 18A via normally closed switch 591 to energize relay coil 592. A seal-in circuit for retaining relay 592 energized is then completed, upon closure of a normally open contact 592–19A. Closure of another normally open contact 592–25A completes a circuit to energize the solenoid 505 for releasing the pivot clamp 125, FIG. 11.

To disengage pivot clamp 180, FIG. 11, solenoid 525 is energized upon momentary closure of a normally open clamp release switch 594, in line 20A, FIG. 12. Closure of switch 594 completes a circuit along line 20A via normally closed clamp switch 595 to energize a relay 596. The seal-in circuit is completed immediately upon closure of normally open contact 596–21A; and, closure of normally open contact 596–26A effects energization of the solenoid 525.

Movement of the pivot clamp 187 to disengaged position is effected by energization of solenoid 535 in response to momentary closure of switch 598, in line 22A, FIG. 12. Upon closure of the normally open push button switch 598, a circuit is completed from energized conductor 585 via a normally closed push button switch 599 to energize a relay 601 which is sealed-in by closure of normally open contact 601–23A. At the same time, closure of another associated normally open contact 601–27A completes a circuit to energize the unclamping solenoid 535. It will be readily apparent that solenoids 487, 505, 525 and 535 may be selectively deenergized upon momentarily depressing a corresponding one of the switches 587, 591, 595 or 599. Likewise, these solenoids may be simultaneously deenergized upon momentarily depressing either the normally closed push button switches 584 or 582.

To effect simultaneous energization of the clamp release solenoids 487, 505, 525 and 535, a common, normally open push button switch 604 may be momentarily depressed. Movement of the push button switch 604 to closed position completes a circuit from the energized conductor 585 via contacts associated with the switch to conductors 605, 606, 607 and 608 respectively connected to effect energization of relays 588, 592, 596 and 601. These relays are simultaneously sealed into closed position upon movement of their normally open contacts in lines 17A, 19A, 21A and 23A to closed position. As hereinbefore explained, closure of the normally open contacts in lines 24A to 27A, inclusive, effects simultaneous energization of the clamp release solenoids 487, 505, 525 and 535.

With the spindle head 27 fully retracted, the spindle support arms fixedly clamped in home positions, and the control circuit, FIG. 12, energized, a multiple tool change cycle may be initiated by momentarily depressing a cycle start switch 612 shown in FIG. 10. As there shown, the sequential steps comprising a complete multiple tool change are under the control of a stepping switch 613. The stepping switch 613 is provided with a common rotatable shaft 614 having secured thereto, in spaced apart relationship, a plurality of radially extending wiper arms 617 to 623, inclusive. Each of the stepping switch wiper arms 617 to 623, inclusive, is adapted to coact with separate, cooperating vertical rows 627 to 633 of terminal contacts. The thirty-one terminal contacts in each of the rows 627 to 633, inclusive, correspond to the thirty-one steps required in a complete tool change cycle, as indicated in the sequence code chart, FIG. 4A. It will be readily apparent that each of the thirty-one vertical rows of steps represented in FIG. 4A correspond to each of the thirty-one steps represented in the horizontal rows of contacts in FIG. 10. For example, with the wiper arms 617 and 623 in their starting, or "home" positions, none of the various actuating solenoids are energized as indicated along the vertical row, step 1 of FIG. 4A. As soon as the multiple tool change operation has been initiated by momentarily depressing push button switch 612, the wiper arms 617 to 623, inclusive, are simultaneously advanced to the second row of contacts, effecting selective energization of solenoids 323, 377 and 393.

As represented diagrammatically in FIG. 10, the stepping switch 613 is provided with a coil 637 which is energizable to effect a single step advancement of the wiper arms 617 to 623, inclusive. During advancement in response to energization of the stepping switch coil 637, an interrupter switch contact 638 is momentarily moved to closed position bridging a circuit between conductors 639 and 640. The conductor 639 is connected directly to the energized input supply conductor 554, and the conductor 640 is connected to one terminal of an interrupting relay 641. The opposite terminal of the coil for the relay 641 is connected directly to the energized input connector 565. Thus, with the switch contact 638 momentarily closed, during stepping advancement of the switch wiper arms, the relay 641 is energized to effect movement of an associated normally closed contact 641–0 to open position to effect deenergization of the stepping switch advancing coil 637 in a manner to stop advancement of the switch wiper arms upon completing the next indexable step. The interrupting relay 641 is provided with another associated contact 641–3 which is moved to closed position immediately upon energization of the relay in response to momentary closure of the interrupter switch contact 638.

As is well known in the stepping switch art, the arrangement is such as to immediately effect a single step advancement of the switch wiper arms 617 to 623, inclusive, upon energization of the switch advancing coil 637. Although not shown in the diagrammatic view, FIG. 10, it will be readily apparent that closure of the interrupter switch contact 638 is responsive to rotation of the shaft 614 during such a single step advancement.

In all cases, it is necessary to effect energization of a vertical conductor 644 to energize the coil 637 to effect a single step advancement of the wiper arms 617 to 623, inclusive. To energize the vertical conductor 644, a circuit must be completed along the horizontal conductor 645 or along one or another of the horizontal conductors 2 to 31, inclusive, via the stepping switch wiper arm 617 to the energized input conductor 554. Thus, whenever the input supply conductor 554 is connected via the conductor 645 or the stepping switch wiper arm 617 to energized conductor 644, a circuit is completed through closed contact bar 641–0 to energize the stepping switch coil 637, connected via its opposite terminal to the energized input conductor 565.

It will be further noted that the energized input conductor 554 is connected to energize the stepping switch wiper arms 618 to 623, inclusive, via branch conductors 648 to 653, inclusive. Thus, a single step advancement of the switch simultaneously advances the wiper arms 617 to 623, inclusive, into engagement with succeeding horizontally aligned terminal contacts respectively disposed in the rows of terminals 627 to 633, inclusive. Each of the contacts in vertical row 627 is disposed to interconnect the energized wiper arm 617 via horizontal lines 2 to 31, inclusive, to effect energization of the vertical conductor 644 upon completion of the various functions required during that step. The wiper arms 618 to 623, inclusive, engage the successive contacts in rows 628 to 633, inclusive, for initiating the selected functions required during a step, the completion of these selected functions being a prerequisite to successively closing the respective circuits from corresponding contacts in row 627 to the vertical conductor 644.

Selected ones of the terminal contacts in rows 628 to 633, inclusive, are connected to solenoids respectively connected to branch conductors 658 to 664, inclusive, which are connected to the energized supply conductor 565. Solenoid 393 for effecting movement of the tool grip actuating sleeve piston 194 to neutral position is interconnected between the second terminal contact in row 628 and vertical branch conductor 658. The second contact terminal in row 628 is likewise connected by means of a common vertical conductor 666 to certain other terminal contacts in row 628, as shown. Thus, whenever the stepping switch wiper arm 618 engages one of the terminal contacts interconnected by the common conductor 666, an energized circuit is completed from conductor 639 via conductor 648, and the wiper arm 618 to energize the control solenoid 393.

In a similar manner, the solenoid 403 for effecting outward forward movement of the piston 194 is interconnected between the sixth terminal contact in row 628 and the vertical energized conductor 658. In order to provide energization of the solenoid 403 at appropriate steps during the tool change cycle, a common vertical conductor 667 is connected to interconnect contact terminals, 6, 7, 8, 9, 10, 18, 19, 20, 21, and 22 of the row 628. In a similar manner, selected terminal contacts in row 629 are connected by means of a common conductor 668 to one terminal of a solenoid 377 connected at its opposite terminals to the vertical energized supply line 659. In the vertical row 630, the third and twentieth terminal contacts are interconnected by a common conductor 671 to the solenoid 336 connected to the energized supply conductor 660. Terminal contacts 9 and 30 in vertical row 630 are interconnected by a common conductor 672 to one terminal of the solenoid 351 connected at its opposite terminal to the energized conductor 660. Solenoids 460 and 461 are respectively interconnected between the energized conductor 660 and contact terminals 15 and 16 in row 630.

The required terminal contacts in vertical row 631 are interconnected by a common conductor 673 to a solenoid 331 connected at its opposite terminal to the energized line 661; and, certain other of the terminal contacts in this row are connected to the solenoid 323 connected at its opposite terminal to the energized vertical conductor 661.

The solenoid 383 is interconnected between the energized vertical conductor 662 and the fifth terminal contact of vertical row 632, the fifth contact thereof being interconnected to other contacts by a common conductor 677. The solenoid 481 is interconnected between the fourteenth and fifteenth terminal contacts of row 632 and the common energized vertical conductor 662. A common conductor 678 interconnecting required terminal contacts of vertical row 633 is connected to one terminal of the solenoid 409 connected via conductor 663 to the energized input supply conductor 565, and solenoid 485 is interconnected between the sixteenth terminal contact and conductor 664 which is energized by supply conductor 565.

As shown in FIG. 10, a plurality of limit and pressure switch contacts are interconnected in the line 645 to preclude inadvertent initiation of a multiple tool change unless the various parts associated with the multiple tool change mechanism are properly positioned. Thus, before the push button 612 may be actuated to initiate a multiple tool change, it is necessary that the normally open contacts in line 645 be in closed position and that the normally closed contacts therein are retained in closed position. The normally open contact 464 is closed whenever the reset piston 450, FIG. 11, is in its leftward reset position. The normally open contact 373 is actuated to closed position by the dog 369, FIG. 9, whenever the movable tool change support 90 is fully retracted relative to its supporting base 86. The normally closed contact 405, FIG. 9, is closed whenever the pressure switch 405 interconnected in the supply line to the tool grip actuating piston 194 in FIG. 9 is deactivated. Likewise, whenever the pressure switches 412 and 394, FIG. 9, are deactivated, the contacts associated therewith in line 645 of FIG. 10 are retained in normally closed position, as shown. The normally open contact 349 is actuated to closed position whenever the entire tool change support mechanism is in its parked or "A" position in front of the storage magazine. Likewise, the normally open contact 318 is actuated to closed position whenever the shot bolt 314 is in its extended engaged position, as represented in FIG. 9.

With these conditions established with respect to the limit switch contacts in line 645 of FIG. 10, the push button switch 612 is momentarily depressed to initiate a multiple tool changing operation. The complete tool change cycle then proceeds automatically in response to operation of the stepping switch 613 until the original set of tools in the tool spindles, FIG. 1, are deposited in the empty storage magazine section, and the next selected set of tools from the tool storage magazine properly positioned and clamped in the tool spindles.

Upon momentary closure of push button switch 612, a starting circuit is completed from energized supply conductor 554 along conductor 645 and the various closed switch contacts to energize line 644. The energized circuit continues from conductor 644 via the normally closed contact 641–0 to energize the stepping switch coil 637, this circuit being completed to the energized conductor 565. Upon energization of the coil 637, the stepping switch wiper arms 617 to 623, inclusive, are simultaneously advanced to engage the second terminal contact in each of the vertical rows of contacts 627 to 633, inclusive. At the same time, the interrupter switch 638 is momentarily closed bridging a circuit from energized conductor 639 to conductor 640 to energize the interrupter relay 641. Thereupon, the associated normally open contact 641–3 is closed to insure interruption of the energized circuit to the coil 637 by opening the associated contact 641–0. As soon as the stepping switch wiper arms engage the second contacts, both the interrupter relay 641 and the stepping switch advancing coil 637 are deenergized. Thus, the contact 641–0 is returned to its normally closed position to condition the circuit for subsequent reenergization of the coil 637 upon completion of the first series of tool changing movements.

Until the movements required during the second step of the tool change cycle have been completed, the vertical conductor 644 is deenergized to preclude inadvertent reenergization of the stepping switch coil 637. Immediately upon relase of the push button switch 612, the energized starting switch circuit along conductor 645 is interrupted. With the wiper arm 617 advanced from its first or "home" position to engage the second terminal contact in the vertical row 627, no circuit is completed along the second horizontal conductor via the normally open switch contact 394 and the normally open switch contact 319. Likewise, no circuit can be completed to conductor 644 via the horizontal lines 3 to 31, inclusive, inasmuch as the energized stepping switch arm 617 is contacting only the second terminal contact. During the second step of the tool change cycle, therefore, the switch wiper arms 618, 619, and 621 effect simultaneous energization of the valve solenoids 393, 377, and 323. As soon as the functions required during the second step have been completed, limit switches 394 and 319 are actuated to closed position, thereby completing a circuit from the energized stepping switch arm 617 through the now closed contacts 394 and 319 to energize the vertical conductor 644. Thereupon, a circuit is again completed via the normally closed contact 641–0 to energize the stepping switch coil 637.

During step two of the multiple tool change cycle, solenoid 323 is energized to effect withdrawal of the shot bolt 314 in preparation for moving the multiple tool change mechanism from the "A" to the "B" position. Likewise, during this step, solenoid 377 is energized to positively retain the changer support piston 366 in fully retracted position, and the solenoids 393 is energized to effect pressure controlled movement of the piston 194 to its central neutral position. Upon these conditions having been satisfied, closure of the associated limit switch contacts 394 and 319 in line 2, FIG. 10, immediately completes a circuit from the energized wiper arm 617 to energize conductor 644 and energize the stepping switch coil 637. Thereupon, the switch wiper arms 617 to 623, inclusive, are simultaneously indexably advanced to the third position. In the third step of the tool change cycle, wiper arms 618 and 619 retain solenoids 393 and 377 energized. Likewise, the stepping switch wiper arm 620 is now connected to effect energization of the solenoid 336 in a manner to operate the piston 333, FIG. 9, for moving the entire tool change mechanism to its "B" position. Upon arrival in the proper position in front of the tool spindles, dog 347 actuates limit switch 348 to closed position. As this occurs, a circuit is then completed from the wiper arm 617 along line 3 via the now closed switch contact 348 to again energize the vertical conductor 644 and energize the coil 637 for simultaneously advancing the switch wiper arms to the fourth position or step of the tool change cycle.

Inasmuch as the tool change mechanism is now positioned in front of the spindle head, the switch wiper arm 621 now effects energization of the solenoid 331 to effect inward movement of the shot bolt 314. As soon as the shot bolt is fully engaged during step four, the associated normally open limit switch contact 318 is actuated to closed position completing a circuit from the stepping switch wiper arm 617 along line 4, to again energize the vertical conductor 644. Thereupon, the stepping switch coil 637 is again energized to simultaneously advance all of the stepping switch wiper arms to the fifth position engaging the fifth set of contacts in the respective rows of contacts 627 to 633, inclusive, in FIG. 10.

At the start of step five of the tool change cycle, the tool change mechanism is positively latched in front of the original set of tools in the tool spindles positioned in their home positions. Thus, during step five, the stepping switch wiper arm 618 engages the fifth terminal contact in row 628 to retain solenoid 393 energized for positively maintaining the tool grip actuating sleve 228 in its neutral positon. At the same time, stepping switch wiper arm 622 engages the fifth terminal contact in row 632 to effect energization of solenoid 383. As hereinbefore explained, energization of solenoid 383 activates the control valve 358, FIG. 9, for urging the movable multiple tool change support 90 to its inward position. As soon as the changer base 90 has advanced a sufficient distance to effect axial release of the spindle clamp rings, limit switch 374 is actuated to closed position, completing a circuit from energized stepping switch wiper arm 617 along line 5 to again energize vertical conductor 644. As soon as this occurs, the stepping switch coil 637 is energized to simultaneously effect advancement of the stepping switch wiper arms 617 to 623, inclusive, from the fifth to the sixth position. With the stepping switch 618 now engaging the sixth terminal contact of vertical row 628, a circuit is completed to effect energization of the solenoid 403 for effecting forward movement of the actuating sleeves 228 in a manner to securely clamp the tool spindles within the individual tool carrying grips 62.

As soon as this occurs, since the tools have been released from clamped engagement within the tool spindles, a circuit is completed along the energized switch wiper arm 617 via line 6 and the now closed limit switch contact 405 and normally closed contact 394 to energize conductor 644. This effects reenergization of the stepping switch coil 637 to effect indexable advancement of the stepping switch wiper arms to the seventh position. During step number seven, solenoid 403 is retained energized in a manner to positively clamp the tool spindles within the cooperating individual tool grips 62. At the same time, the stepping switch wiper arm 619 now engages contact number 7 of row 629 to effect energization of the solenoid 317. Thereupon, the movable tool change support is moved to fully retracted position withdrawing all of the tools from their cooperating tool spindles. Upon return movement to fully retracted position, an indexing circuit is again completed via energized switch arm 617 along line 7 and through the now closed limit switch contact 373 to reenergize conductor 644 for effecting a stepping energization of coil 637.

The stepping switch wiper arms are now indexed into engagement with the eighth contact in each row 627 to 633, inclusive.

During the eighth step of the tool change cycle, wiper arm 621 effects reenergization of solenoid 323 for fully retracting the shot bolt 314. Upon closure of limit switch 319, therefore, a circuit is then completed from switch wiper arm 617 along line 8 to reenergize conductor 644 and stepping switch advancing coil 637.

The coil 637 is operative to advance the switch wiper arms from the eighth to the ninth positions, in which the switch wiper arm 620 effects energization of solenoid 351 to return the tool change mechanism into the "A" position in front of the empty tool storage magazine section. Upon arrival of the tool change mechanism in the position in front of the tool storage magazine, limit switch 349 is actuated to closed position completing a circuit from the switch wiper arm 617 along line 9 to again energize the stepping switch coil 637 for advancing the stepping switch wiper arms to the tenth position.

During the tenth step of the tool change cycle, the switch wiper arm 621 effects reenergization of solenoid 331 for reengaging the shot bolt 314 with its cooperating index notch 312. Limit switch 318 is then actuated to closed position to complete a circuit from the switch wiper arm 617 along line 10 to energize coil 637 for advancing the stepping switch wiper arms to the eleventh position.

As hereinbefore explained, it will be apparent that completion of each indexable advancement of the stepping switch wiper arms conditions the coil 637 for subsequent reenergization to effect the next indexable step. However, such indexable movement does not occur until the required functions performed by stepping switch wiper arms 618 to 623 have been effected. Thereupon, after the functions have been effected, a circuit is automatically completed to energize the vertical conductor 644 and the coil 637 for the next step.

During the eleventh step of the tool change cycle, wiper arms 618, 621 and 622 are operative to effect simultaneous energization of solenoids 403, 331 and 383. Solenoid 383 is energized to effect forward movement of the changer support piston 366 to insert the previously used tools into the empty storage sockets of the empty magazine section. As soon as the reinsertion of the tools has been completed, limit switch 375 is activated to closed position to complete a circuit for advancing the switch wiper arms to the twelfth position.

During step twelve, solenoid 409 is energized by stepping switch wiper arm 623 to effect retracting movement of the piston 194 for unclamping the tool changer collets from engagement with the tools deposited in the storage magazine. As soon as this occurs, limit switch 412 is closed to effect reenergization of the coil 637 for advancing the switch wiper arms to the thirteenth position. In step thirteen, solenoid 377 is energized by stepping switch wiper arm 619 to effect retracting movement of the movable tool change support 90 for withdrawing the released tool grips from engagement with the tool spindles. Upon subsequent closure of limit switch 373 in line 13, FIG. 10, a circuit is completed from the wiper arm 617 to advance the wiper arms to the fourteenth position.

During steps fourteen to sixteen, inclusive, the shot bolt controlling positioning of the tool storage magazine is retracted, the magazine is selectively advanced for positioning the next set of tools, and the shot bolt is reengaged. In addition, the indexing piston 450, FIG. 11, for indexably advancing the tool storage magazine 58 is moved to its reset position as there shown.

With a new set of tools now positioned for engagement with the individual tool grips, limit switches 465 and 475 are moved to closed position to complete a circuit along the line 16 for effecting indexable advancement of the switch wiper arms into their seventeenth position. Thereupon, solenoid 383 is reenergized to effect movement of the tool change support 90 for advancing the individual tool grips 62 toward the next set of tools carried by the properly positioned tool storage magazine section. During steps eighteen and nineteen, the new set of tools is securely clamped within the individual tool grips and the changer support piston 366 is actuated to effect retracting movement of the support 90 for withdrawing the selected tools from the storage magazine section. During steps twenty and twenty-one, the indexable wiper arms control return movement of the tool change mechanism carrying the selected tools from the "A" to the "B" position. With the storage magazine now latched in front of the empty tool spindles, the changer support piston 366 is again activated to effect insertion of the selected tools into the empty tool spindles during step twenty-two.

Next, the switch wiper arms are sequentially advanced through steps twenty-three to twenty-six, inclusive, for unclamping the tool changer collets and reactuating the spindle collets into clamped engagement with the selected set of tools. After this has been accomplished, during steps twenty-seven to thirty-one, inclusive, the wiper arms are successively indexed to effect return movement of the movable tool change support 90 to retracted position, and bodily movement of the entire tool change mechanism to its "A" position in front of the empty tool storage magazine section. In step thirty-one of the tool change cycle, solenoid 331 is energized by switch wiper arm 620 for actuating the shot bolt 314 into latching engagement with the indexable notch 312, FIG. 9. Thereupon, closure of the associated normally open limit switch 315 completes a circuit from the energized switch wiper arm 617 along line 31 to reenergize conductor 644 and stepping switch coil 637. The last energization of coil 637 in response to closure of switch contact 315, line 31, effects a simultaneous indexable movement of the switch wiper arms 617 to 623, inclusive, to their home or starting positions in step number one. The entire multiple tool change circuit shown in FIG. 10 is now conditioned for the next multiple tool change operation in response to closure of push button switch 612 as hereinbefore explained.

Although particular structures and control circuitry have been shown and described in considerable detail as exemplifying the manner in which the various embodiments of the invention may be practiced, it will be apparent to those skilled in the art to which this invention relates that various modifications of the structures and control circuitry herein shown may be effected without departing from the spirit and scope of the invention as defined in the subjoined claims.

The principles of this invention having now been fully explained in connection with the foregoing description, we hereby claim as our invention:

1. In a machine tool, a frame, a spindle head slidably carried by said frame for rectilinear movement, a plurality of tool spindles movably carried for selective lateral positioning movement relative to said spindle head in a plane perpendicular to the axis of movement thereof, power operated clamping means operative to releasably clamp said tool spindles in preselected laterally adjusted positions, said tool spindles being rotatable about axes parallel to the axes of movement thereof, first power drive means connected to rotate said tool spindles irrespective of the laterally adjusted positions thereof, second power operable means connected to effect bodily movement of said spindle head for moving said spindles to perform a multiple machining operation, tool storage means adapted to store a plurality of sets of tools, a tool change mechanism provided with a plurality of separate tool grips, and third power operable means connected to actuate said tool change mechanism for effecting an interchange of tools between said tool spindles and said storage magazine.

2. In a machine tool, a plurality of tool spindles carried for lateral positioning movement with respect to their axes of rotation, clamping means operative to fixedly secure said spindles in preselected laterally adjusted positions, tool securing means associated with said tool spindles, and a tool change mechanism operative to insert a plurality of tools into said spindles, and actuating means movably supported by said securing means to be shifted by said tool changer after the tools have been inserted in said spindle to actuate said tool securing means for positively securing said tools in said spindles.

3. In a machine tool, a frame, a spindle head slidably carried by said frame for bodily movement to perform a multiple machining operation, a plurality of tool spindles rotatably journalled in said spindle head for rotation about axes parallel to the axis of spindle head movement, selectively actuatable tool securing means respectively associated with said spindles, actuating means carried by said securing means for movement between an actuating position for actuating said securing means to lock a tool in its associated spindle and a release position for releasing a tool in its associated spindle, a multiple tool changer actuatable to simultaneously grip a plurality of tools carried by said tool spindles, first power operable means connected to actuate said tool changer for simultaneously gripping a plurality of tools, a tool storage magazine movably carried in spaced proximity to said tool spindles, a plurality of tool storage sections supported by said magazine for movement therewith, each of said sections carrying a set of tools, means for moving said magazine to selectively locate any one of said storage sections in a ready position, second power operable means connected to effect bodily movement of said tool changer between said tool spindles and said tool storage magazine, control means connected to actuate said power operable means sequentially for effecting an interchange of tools between said tool spindles and the tool storage section in the ready position and means carried by said tool changer for shifting said actuating means between the actuating position and the release position as an incident to effecting a complete interchange of tools between said tool spindles and said tool storage magazine.

4. In a machine tool, a multiple tool transfer mechanism comprising a base support carried for longitudinal movement, a movable support carried for transverse movement by said base support, a plurality of individual tubular tool grips carried by said movable support and extending in axial parallelism to the transverse axis of movement thereof, tubular changer collets carried by said grips for releasable clamping movement, collet actuating means movably carried by said grips and connected to selectively actuate said changer collets carried thereby, first power operable means connected to move said base support, second power operable means connected to move said changer support relative to said base support, third power operable means connected to selectively move said collet actuating means, two sets of spaced apart tool receiving sockets, and a selectively operable control system connected to effect coordinated actuation of said power operable means for interchanging a complete set of tools between said sets of storage sockets.

5. In a machine tool having a tool spindle, a bodily movable tool change grip comprising a stationary tubular support sleeve, a plurality of cam levers pivotably secured to said sleeve for limited pivotable radial movement, a tubular tool changer collet carried toward one end of said stationary sleeve, a concentrically disposed actuating sleeve carried by said support sleeve and connected to effect selective pivotable movement of said cam levers for actuating said collet into gripping engagement with a concentrically disposed rotatable cutting tool, power operable means connected to effect bodily movement of said tool change grip for moving said collet into engagement with a tool in said spindle and shifting said actuating sleeve for actuating said collet to secure the tool to said grip prior to withdrawing a rotatable cutting tool from engagement with the tool spindle.

6. In a machine tool, a plurality of spindle holders carried for selective lateral positioning movement into loading and operating positions, a tool carrying spindle rotatably carried by each of said holders for positioning movement therewith, power drive means connected to rotate said tool spindles, power operable clamps disposed to releasably clamp said spindle holders in said selected laterally adjusted positions, power operable control means connectable to selectively release said power operable clamps for laterally moving said holders to position said spindles in said predetermined loading positions, a tool storage magazine having a plurality of sets of tool receiving storage sockets, each set of storage sockets in said magazine being spaced in correspondence with the spacing of said tool spindles clamped in loading position, a multiple tool change mechanism, a plurality of individual tool securing grips carried by said mechanism and being spaced apart in correspondence with the spacing of said tool spindles clamped in loading position, and power operable control means connected to coordinately activate said magazine and said tool change mechanism for effecting an interchange of a set of tools between said tool spindles and said storage magazine.

7. In combination with a multiple spindle drilling machine, a plurality of parallel spindles carried for lateral bodily positioning movement, bodily movable spindle support holders respectively disposed to rotatably support said spindles, automatically engageable clamps connected to respectively clamp said spindle holders to said frame, power operated control means selectively actuatable to release said clamps for effecting selective lateral positioning movement of said spindles and said holders, and power operable drive means connected to drive said spindles irrespective of their laterally adjusted positions relative to said frame; a spaced apart tool storage magazine comprising a plurality of tool storage sections, each of said storage sections being provided with a plurality of tool receiving sockets and associated tool retaining means, and control means for effecting selective positioning of said tool storage magazine for bringing a preselected tool storage section into predetermined relationship to said tool spindles; a tool change mechanism carried for selective transfer movement between one of said magazine storage sections and said tool spindles, said tool change mechanism comprising a plurality of independently operable tool receiving grips, and power operable control means connected to effect coordinated operation of said tool change mechanism and said individual tool receiving grips in a manner to interchange a complete set of tools between said prepositioned tool spindles and said tool storage magazine.

8. In a multiple spindle drilling machine having a supporting frame, a plurality of spindle holders movably supported by said frame for lateral positioning movement, a plurality of tool spindles respectively journalled in said holders for rotation about axes perpendicular to the plane of lateral adjustment thereof, a single selectively releasable clamp respectively associated with each of said spindle holders for releasably clamping the associated holder to said frame at one point, a plurality of releasable bridge clamps respectively operative to simultaneously clamp separate groups of said holders to said frame, each of said bridge clamps being located in laterally spaced relationship to said single clamps respectively associated with corresponding ones of said holders, power operable control means respectively operative to selectively release said single clamps and said bridge clamps for effecting selective lateral positioning movement of said spindles and their associated holders, selectively releasable tool securing means associated with each of said spindles, a selectively positionable tool storage magazine adapted to store a plurality of sets of tools for subsequent insertion into said tool spindles, a tool change mechanism provided with a plurality of independently operable tool gripping means, first power operable means connected to move said tool change mechanism toward a set of tools in said storage magazine, second power operable means connected to actuate said gripping means for securing a complete set of tools to said tool change mechanism, means for reversing the operation of said first power operable means to withdraw the tools from said storage magazine, third power operable means connected to move said tool change magazine into a position aligned with said tool spindles, means for actuating said first power operable means to insert said selected tools into said spindles, means for actuating said second power operable means for releasing said tool change mechanism tool securing means and actuating said spindle securing means to clamp said selected tools in said spindles, and means for sequentially actuating said first and third power operable means for returning said tool change mechanism to its starting position.

9. In a machine tool, a multiple tool transfer mechanism comprising a base support carried for longitudinal movement, a movable support carried for transverse movement by said base support, a plurality of (bodily movable) tool change grips respectively comprising a stationary tubular support sleeve carried by said movable support and extending in axial parallelism to the transverse axis of movement thereof, a plurality of cam levers pivotably secured to said sleeve for limited pivotable radial movement, a tubular tool changer collet carried toward one end of said stationary sleeve, a concentrically disposed actuating sleeve carried by said support sleeve and connected to effect selective pivotable movement of said cam levers for actuating said collet into gripping engagement with a concentrically disposed cutting tool, first power operable means connected to move said base support, second power operable means connected to move said changer support relative to said base support, third power operable means connected to selectively move said actuating sleeve respectively associated with each of said plurality of said tool change grips, two sets of spaced apart tool receiving sockets, and a selectively operable control system connected to effect coordinated actuation of said power operable means for interchanging a complete set of tools between said sets of storage sockets.

10. In a machine tool, a plurality of tool receiving spindles carried for bodily movement to perform multiple machining operations, a tool storage magazine, and a power driven multiple tool change mechanism movable in two rectilinear mutually transverse paths of travel to transfer a preselected plurality of tools from said magazine into said spindles for subsequent movement therewith to perform multiple machining operations.

11. In a machine tool, a drilling tool spindle provided with a socket adapted to removably receive the shank end of a tool having a forwardly extending cutting portion, a bodily movable tubular tool changer movable into position to encompass the forward cutting portion of a tool carried by said spindle with the forward end thereof being adjacent the front face of said spindle, a releasable tool grip carried toward the forward end of said tubular changer in a position to engage a tool shank, and power operable means connected to actuate said tubular changer into position over a tool shank carried by said spindle and thereupon to actuate said grip into engagement with the tool shank, and reversible means for bodily removing said changer including the power engaged grip for bodily withdrawing the drill from said spindle.

12. In a machine tool, a frame, a spindle head slidably carried by said frame, a plurality of tool spindles rotatably journalled in said spindle head, tool securing means associated with said spindles, a tool storage magazine movably carried in spaced relationship to said spindle head, a plurality of tool storage sections supported by said magazine for movement therewith, each of said sections being adapted to carry a set of tools in a predetermined relationship relative to each other, means for moving said magazine to selectively locate any one of said storage sections in a ready position, and a tool changer operable by power to engage the tools carried by the storage section in the ready position and to transfer the complete set of tools from the storage section to said spindles and insert each tool into operating position in one of the several spindles for the performance of a machining operation.

13. In a machine tool, a frame, a spindle head slidably carried by said frame, a plurality of tool spindles rotatably journalled in said spindle head, a tool storage magazine movably carried in spaced relationship to said spindle head, a plurality of tool storage sections supported by said magazine for movement therewith, each of said sections being adapted to carry a set of tools in a predetermined relationship relative to each other, means for moving said magazine to selectively locate any one of said storage sections in a ready position, a carriage carried by said frame for movement in a first rectilinear path of travel, a tool changer movably carried by said carriage for movement in a second rectilinear path of travel, and means for actuating said tool changer for interchanging tools by sets between said ready position and said plurality of spindles.

14. In a machine tool, a frame, a spindle head, a plurality of tool spindles rotatably journalled in said spindle head, a tool storage magazine movably carried in spaced relationship to said spindle head and adapted to carry a plurality of tools in sets with each set comprising several tools for simultaneous use in said several spindles, a tool changer supported by said frame for rectilinear movement in two directions of travel with the movement in one direction serving to shift said changer from said tool storage magazine to said spindle head and return while the second direction of travel serves to move said changer selectively toward and away from said spindle head and said magazine, and means for actuating said changer in its rectilinear directions of travel for interchanging tools in sets between said tool storage magazine and said spindle head.

15. In a multiple spindle machine tool, a frame, a spindle head, a plurality of tool spindles journalled in said head, spindle securing means in each of said spindles for releasably securing tools therein, a tool storage magazine adapted to carry several sets of tools with each set comprising a plurality of tools for simultaneous use in said spindles, a multiple tool changer movably carried by said frame for interchanging tools in sets between said spindles and said tool storage magazine, a plurality of carriers mounted on said changer for supporting the tools that are being transferred, a grip on each of said carriers for releasably gripping a tool to lock it to said carrier, and means to actuate said spindle securing means for releasing the tools in said spindles and actuate said grips for securing the tool to said carrier for transfer from said spindle head to said tool storage magazine.

References Cited by the Examiner
UNITED STATES PATENTS

| | | | |
|---|---|---|---|
| 766,748 | 8/04 | Vauclain | 77—24.1 |
| 2,096,754 | 10/37 | Oberhoffken et al. | 77—22 |
| 2,453,825 | 11/40 | Wright | 77—60 |
| 2,707,572 | 5/55 | Rothman | 294—87 |
| 2,714,318 | 8/55 | Norman et al. | 77—60 |
| 2,900,184 | 8/59 | Lauring | 269—287 |
| 2,901,927 | 9/59 | Morgan | 77—5 |
| 2,920,891 | 1/60 | Sherman | 273—43 |
| 2,925,016 | 2/60 | Walter et al. | 77—5 |
| 3,052,011 | 9/62 | Brainard | 29—26 |
| 3,099,873 | 8/63 | Brainard | 29—26 |

RICHARD H. EANES, Jr., *Primary Examiner.*

FRANK E. BAILEY, FRANK H. BRONAUGH,
*Examiners.*